(12) United States Patent
Kim

(10) Patent No.: US 10,536,229 B2
(45) Date of Patent: Jan. 14, 2020

(54) METHOD AND DEVICE FOR PROVIDING COORDINATED COMMUNICATION OF PLURALITY OF BASE STATIONS IN COMMUNICATION SYSTEM TO WHICH BEAMFORMING IS APPLIED

(71) Applicant: Samsung Electronics Co., Ltd., Suwon-si, Gyeonggi-do (KR)

(72) Inventor: Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/774,975

(22) PCT Filed: Nov. 9, 2016

(86) PCT No.: PCT/KR2016/012875
§ 371 (c)(1),
(2) Date: May 9, 2018

(87) PCT Pub. No.: WO2017/082632
PCT Pub. Date: May 18, 2017

(65) Prior Publication Data
US 2018/0351668 A1    Dec. 6, 2018

(30) Foreign Application Priority Data
Nov. 9, 2015    (KR) .................. 10-2015-0156773

(51) Int. Cl.
*H04B 17/345*    (2015.01)
*H04B 7/06*    (2006.01)
(Continued)

(52) U.S. Cl.
CPC ......... *H04B 17/345* (2015.01); *H04B 7/0626* (2013.01); *H04L 27/2691* (2013.01); *H04W 72/046* (2013.01)

(58) Field of Classification Search
CPC .... H04B 17/345; H04B 7/024; H04B 7/0617; H04B 7/0626; H04W 52/244;
(Continued)

(56) References Cited

U.S. PATENT DOCUMENTS

2011/0211618 A1    9/2011    Oyman et al.
2011/0223928 A1    9/2011    Seo et al.
(Continued)

FOREIGN PATENT DOCUMENTS

KR    10-2010-0064424 A    6/2010
KR    10-2013-0021921 A    3/2013

OTHER PUBLICATIONS

ISA/KR, "International Search Report and Written Opinion of the International Searching Authority," International Application No. PCT/KR2016/012875, dated Feb. 13, 2017, 12 pages.

*Primary Examiner* — Afshawn M Towfighi

(57) ABSTRACT

The present disclosure relates to a 5G or pre-5G communication system to be provided for supporting a data transmission rate higher than that of a 4G communication system such as LTE. The present disclosure relates to a method for providing coordinated communication of a plurality of base stations, comprising the steps of: determining an interference value for each beam in a serving base station on the basis of interference signals received from neighboring base stations and transmitting the interference value for each beam to the neighboring base stations; determining a wireless resource and a beam for the coordinated communication by using the interference value for each beam and transmitting allocation information of the determined wireless resource and beam to the neighboring base stations; and determining a terminal, which will use the wireless resource and beam in a time period prior to a time period in which the coordinated communication is performed.

16 Claims, 23 Drawing Sheets

(51) Int. Cl.
*H04L 27/26* (2006.01)
*H04W 72/04* (2009.01)

(58) Field of Classification Search
CPC ... H04W 52/42; H04W 52/40; H04W 72/046; H04J 11/0053; H04J 11/0056; H04L 27/2691
See application file for complete search history.

(56) References Cited

U.S. PATENT DOCUMENTS

| | | |
|---|---|---|
| 2011/0249642 A1 | 10/2011 | Song et al. |
| 2013/0053077 A1 | 2/2013 | Barbieri et al. |
| 2013/0053079 A1 | 2/2013 | Kwun et al. |
| 2015/0016434 A1* | 1/2015 | Luo ................. H04W 72/082 370/336 |

\* cited by examiner

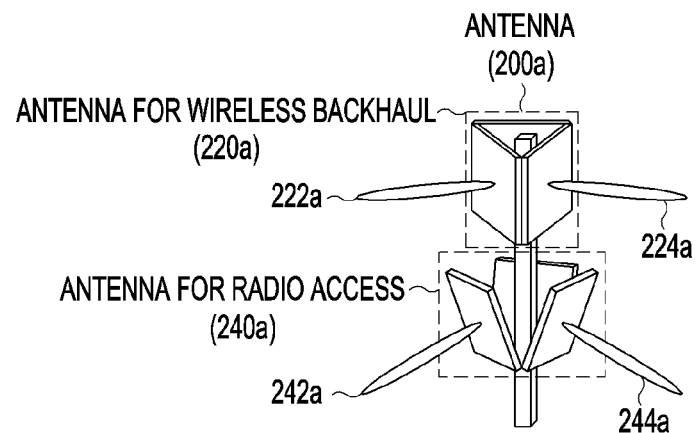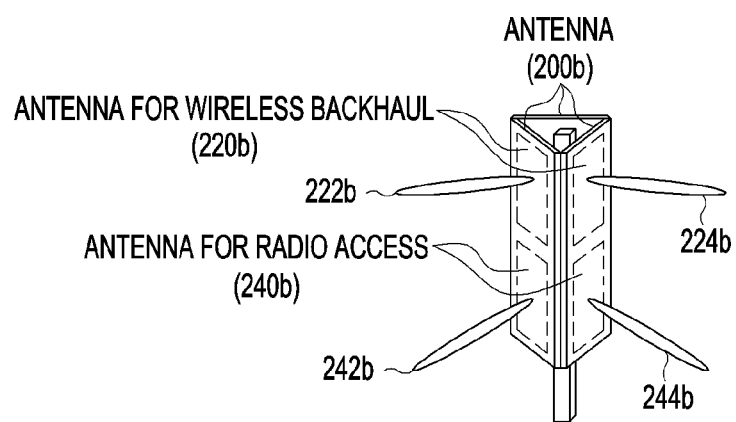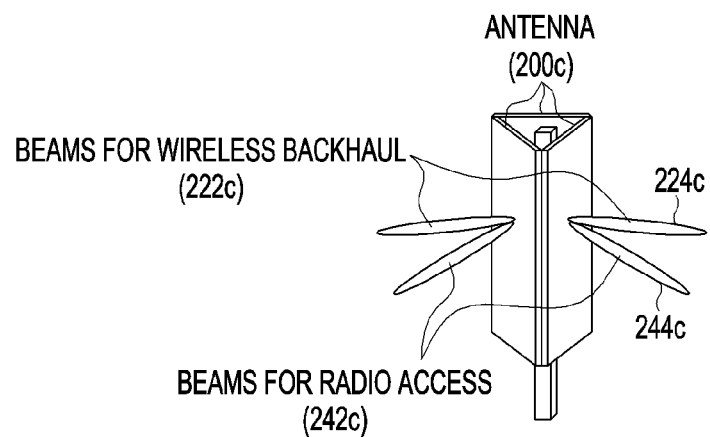
FIG.2

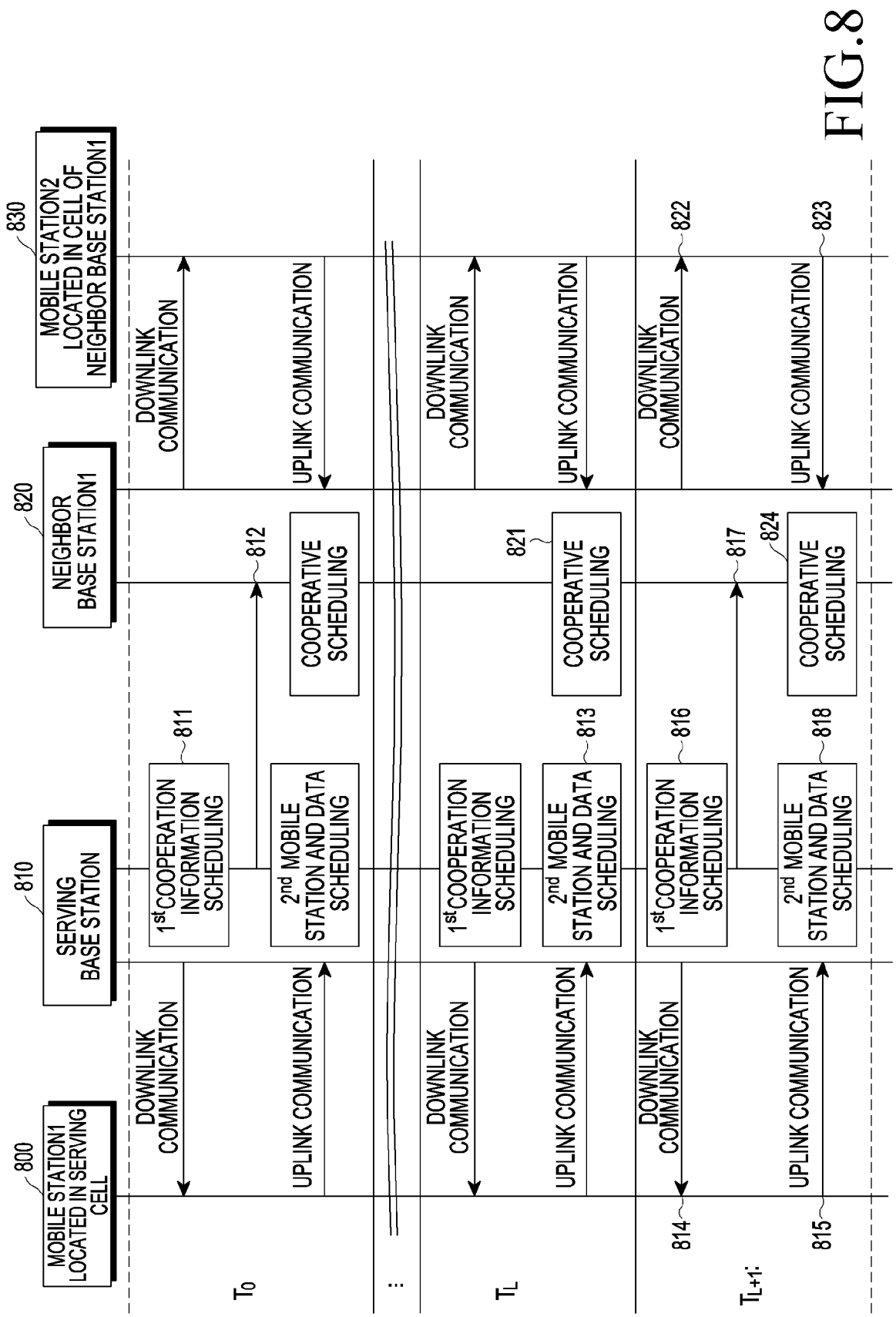

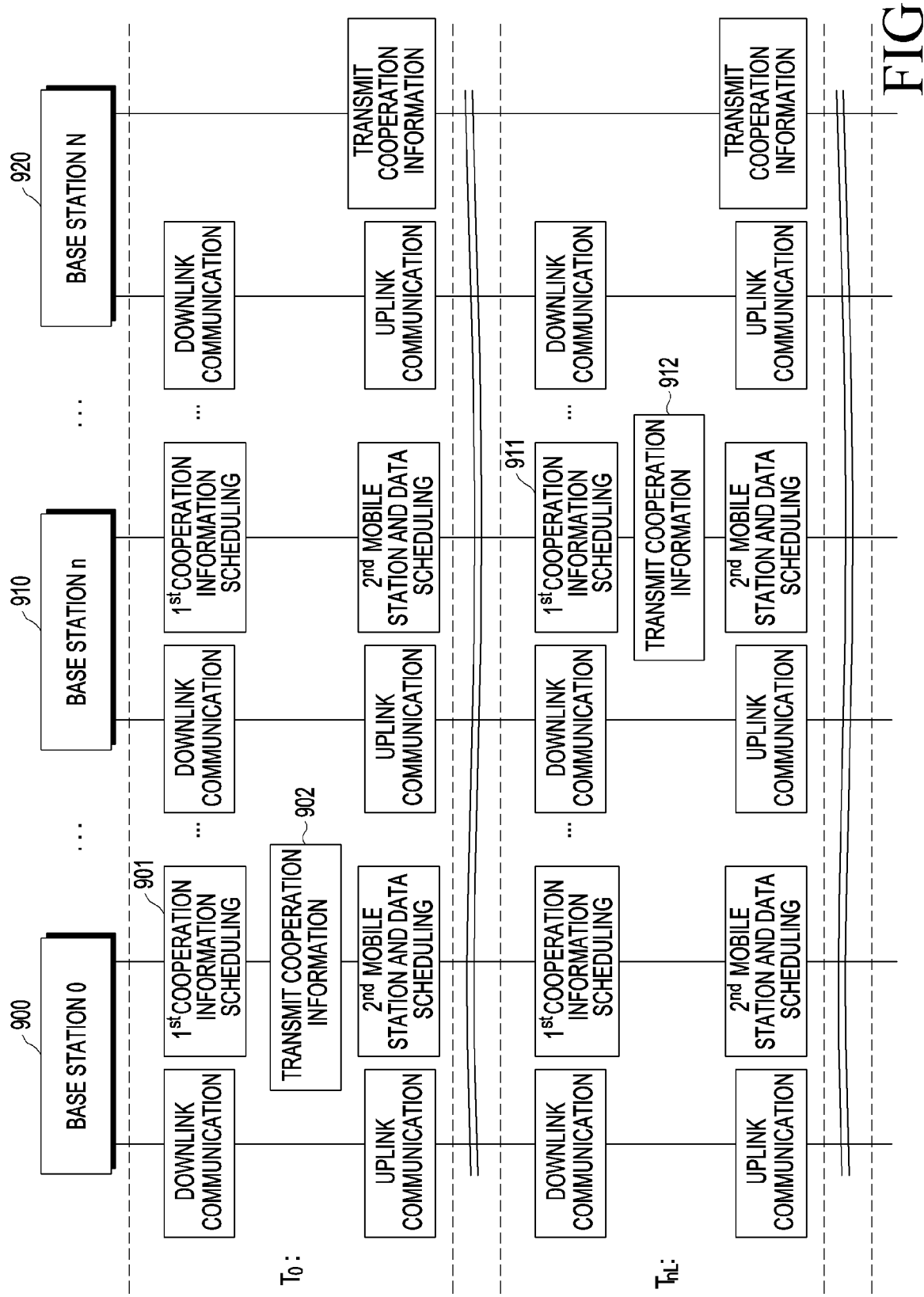

METHOD AND DEVICE FOR PROVIDING COORDINATED COMMUNICATION OF PLURALITY OF BASE STATIONS IN COMMUNICATION SYSTEM TO WHICH BEAMFORMING IS APPLIED

CROSS-REFERENCE TO RELATED APPLICATIONS AND CLAIM OF PRIORITY

This application is a 371 of International Application No. PCT/KR2016/012875 filed on Nov. 9, 2016, which claims priority to Korean Patent Application No. 10-2015-0156773 filed on Nov. 9, 2015, the disclosures of which are incorporated herein by reference in their entireties.

BACKGROUND

1. Field

The disclosure relates to methods and devices for providing cooperative communications among multiple base stations using beamforming antennas.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FOAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Specifically, existing cooperative communications are defined as multi-cell cooperative technology in which multiple base stations communicate cooperatively. In such multi-cell cooperative technology, base stations should share various types of information (hereinafter, "cooperation information") necessary for cooperation, e.g., wireless communication channel information measured by the mobile station. Such existing multi-cell cooperative technology pertains to the cases where base stations use sector antennas—where base stations use beamforming antennas, it is difficult to obtain performance given the beamforming nature, and where applied to mobile station mobile environments, it leads to increases in the amount of resources supposed to be shared and the number of times in which cooperation information is shared. Accordingly, a need exists for enhancing multi-cell cooperative technology using beamforming antennas.

SUMMARY

According to the disclosure, there is proposed a method and device for cooperative communications for multiple base stations using beamforming antennas.

According to the disclosure, there is proposed a method and device properly reducing the amount of interference information among neighbor base stations required upon cooperative communications by determining an interference value per base station beam in a mobile communication system using beamforming antennas.

The disclosure also concerns a method and device that distributively schedule a plurality of base stations that cooperatively communicate on a mobile communication system using beamforming antennas. Specifically, the disclosure provides distributed cooperation among base stations using beamforming antennas on uplink, as well as on downlink.

According to an embodiment of the disclosure, base stations obtain downlink interferences from downlink interference rather than directly measuring from mobile stations. This may reduce a waste of radio resources for uplink interference.

According to the disclosure, there is proposed a method and device performing two-stage scheduling to maximize the performance of cooperative communications among base stations over a mobile station which is on the move, when a delay occurs over the network.

The disclosure also pertains to a method and device conducting cooperative communications that allocate resources taking into account mutual interference among base stations in a layer cell environment with at least one small cell in one macro cell area.

According to an embodiment of the disclosure, a method for providing cooperative communication by a plurality of base stations comprises the steps of determining per-beam interference values of a serving base station based on signals received from at least one mobile station or neighbor base stations and delivering the per-beam interference values to the neighbor base stations, determining a radio resource and a beam for the cooperative communication based on the per-beam interference values and delivering allocation information about the radio resource and the beam to the neighbor base stations, and determining a mobile station to use the radio resource and the beam during a time interval previous to a time interval during which the cooperative communication is performed.

According to an embodiment of the disclosure, a device for providing cooperative communication by a plurality of base stations comprises a controller determining per-beam interference values of a serving base station based on interference signals received from neighbor base stations, determining a radio resource and a beam for the cooperative communication based on the per-beam interference values, and determining a mobile station to use the radio resource and the beam during a time interval previous to a time interval during which the cooperative communication is performed and a transceiver delivering the per-beam interference values and allocation information about the radio resource and the beam to the neighbor base stations.

BRIEF DESCRIPTION OF THE DRAWINGS

FIG. 2 is a view illustrating an embodiment for the structures of an antenna for radio backhaul and an antenna for radio access according to an embodiment of the present disclosure;

FIG. 8 is a view illustrating an example of distributed cooperative communications which are performed with two neighbor base stations in an environment where a time delay occurs on a network according to an embodiment of the present disclosure;

FIGS. 9a and 9b are views illustrating examples of the operations of performing distributed cooperative communications by N+1 neighbor base stations in an environment where a time delay exists on a network according to another embodiment of the present disclosure;

DETAILED DESCRIPTION

Figure 1:
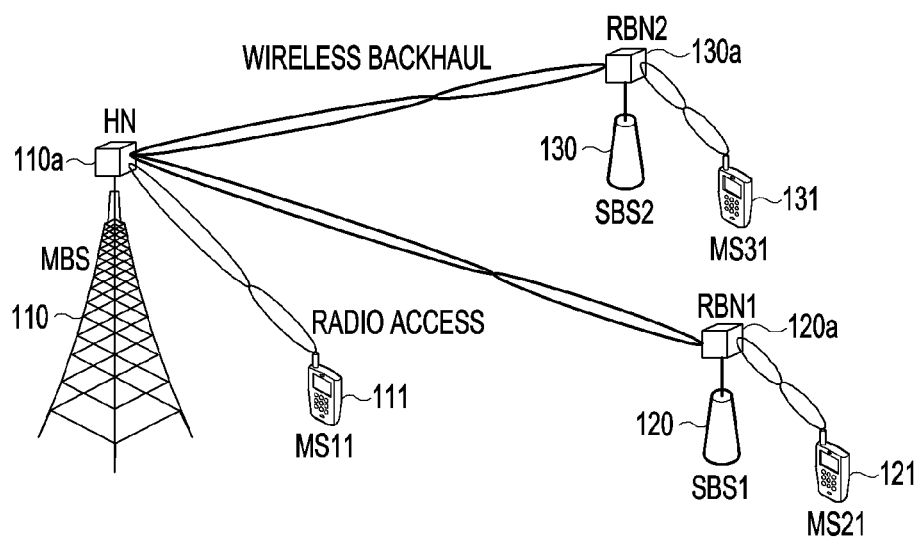
FIG. 1 is a view illustrating an example of a configuration of a layer cell providing a network connection according to an embodiment of the present disclosure.

Hereinafter, embodiments of the present disclosure are described in detail with reference to the accompanying drawings. The same reference numerals are used to refer to same elements throughout the drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may include a communication function. For example, the electronic device may be a smartphone, a tablet personal computer (hereinafter, referred to as a "PC"), a mobile phone, a video phone, an e-book reader, a desktop PC, a laptop PC, a netbook PC, a personal digital assistant (hereinafter, referred to as a "PDA"), a portable multimedia player (hereinafter, referred to as a "PMP"), an MP3 player, a mobile medical device, a camera, a wearable device (e.g., a head-mounted device (referred to as, e.g., an "HMD")), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital video disc (hereinafter, referred to as "DVD") player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (hereinafter, referred to as "MRA") device, a magnetic resource imaging (hereinafter, referred to as "MRI") device, a computed tomography (hereinafter, referred to as "CT") device, an imaging device, or an ultrasonic device), a navigation device, a global positioning system (hereinafter, referred to as "GPS") receiver, an event data recorder (EDR), a flight data recorder (hereinafter, referred to as "FDR"), an automotive infotainment device, an sailing electronic device (e.g., a sailing navigation device, a gyroscope, or a compass), an aviation electronic device, a security device, or a robot for home or industry.

According to various embodiments of the disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the disclosure, an electronic device may be a combination of the above-listed devices. It should be appreciated by one of ordinary skill in the art that the electronic device is not limited to the above-described devices.

According to an embodiment of the present disclosure, the terminal may be, e.g., an electronic device.

Meanwhile, methods and apparatuses as proposed according to an embodiment of the present disclosure may apply to various communication systems, including institute of electrical and electronics engineers (hereinafter, referred to as "IEEE") 802.11ac communication systems, IEEE 802.16 communication systems, digital multimedia broadcasting (hereinafter, referred to as "DMB") services, digital video broadcasting-handheld (hereinafter, referred to as "DVP-H") and advanced television systems committee-mobile/handheld (ATSC-M/H, hereinafter, referred to as "ATSC-M/H") services or other mobile broadcasting services, internet protocol television (hereinafter, referred to as "IPTV") services or other digital video broadcasting systems, MPEG media transport (hereinafter, referred to as "MMT") systems, evolved packet systems (hereinafter, referred to as "EPS"), long-term evolution (hereinafter, referred to as "LTE") mobile communication systems, LTE-advanced (hereinafter, referred to as "LTE-A") mobile communication systems, high speed downlink packet access (hereinafter, referred to as "HSDPA") mobile communication systems, high speed uplink packet access (hereinafter, referred to as "HSUPA") mobile communication systems, 3rd generation project partnership 2 (hereinafter, referred to as "3GPP2") high rate packet data (hereinafter, referred to as "HRPD") mobile communication systems, 3GPP2 wideband code division multiple access (hereinafter, referred to as "WCDMA") mobile communication systems, 3GPP2 code division multiple access (hereinafter, referred to as "CDMA") mobile communication systems, mobile internet protocol (hereinafter, referred to as "Mobile IP") systems, or so.

The description that follows is made based on beamforming-applied communication systems for ease of description, according to the present disclosure. Here, a beamforming-applied communication system may consist of, e.g., at least one base station using beamforming antennas and at least one user equipment (UE) using beamforming antennas.

In general, in a beamforming-applied communication system, a mobile station using beamforming antennas measures on radio channels and interference for each beam of base station on downlink (DL). The result of measurement is one piece of cooperation information that should be shared among base stations to carry out cooperative communications. Accordingly, the amount of cooperative communications may increase in proportion to the total number of the beams.

Given the mobile communication environment besides this, the mobile station need again perform measurement and sharing of cooperation information whenever it moves, resulting in the waste of radio resources. Further, on uplink UL, each of the base stations performing cooperative communications should measure uplink interferences due to all the mobile stations in the neighbor cell, and when a corresponding mobile station moves, it should measure again interferences. This may lead to a significant waste of radio resources due to measurement of uplink interference, accelerating the deterioration of uplink communication capability.

Meanwhile, there are various cooperative methods supporting multi-cell cooperative technology. The first one is the interference avoidance method to minimize the amount of uplink and downlink interference, by neighbor cell base stations, with each other. Another way is joint transmission in which, on downlink, neighbor cell base stations simultaneously transmit data to the same mobile station. At this time, on uplink, a plurality of per-cell base stations simultaneously receive uplink signals from one mobile station, merge the received signals, and detect data—i.e., they perform joint reception. Among them, joint transmission and reception, although giving high performance, suffers from high complexity in implementation. In contrast, the interference avoidance scheme is advantageous over joint transmission and reception in that it is less tricky to implement despite its lower performance. Among the methods set forth above are a centered cooperation scheme in which a single scheduler controls all the base stations that carry out cooperative communications and a distributed cooperation scheme in which an independent scheduler is implemented per base station thereby to provide cooperative communications. The centered scheduling scheme may make use of all the cooperation methods set forth above with a higher performance, yet suffers from high complexity in implementation. Conversely, the distributed cooperative scheduling scheme, although less complicated in implementation, has limitations such as reduced performance as compared with the centered scheme, and being able to be implemented with only some of the cooperation methods.

During the course of sharing cooperation information by a plurality of base stations for cooperative communications, a time delay may arise on the network connecting the base stations together. In this case, the time delay may vary depending on the performance and structure of network. Such time delay may be large enough to reach, e.g., a few tens of ms or more. As such, if a time delay is caused by the network, the performance deteriorates due to multi-cell cooperative technology. In particular, where base stations use beamforming antennas, the performance deterioration further increases with the result of causing problems with beamforming communications.

Further, given the layer cell environment in which at least one small cell is added in the macro cell area during cooperative communication, dedicated radio resources may additionally be allocated for the small cell, and the radio resources allocated may be left at a fixed size or varied very slowly considering the long-term characteristics of radio channels and user (traffic). For example, 3GPP LTE systems may designate dedicated radio resources, i.e., almost blank subframes (ABSs), of small cells in the layer cell environment, and the base station of the macrocell and the base station of the small cell may cooperatively communicate based thereupon. At this time, the radio resources allocated in the ABSs, normally, may remain in a fixed size or slowly change taking into consideration the long-term characteristics of user traffic and radio channels. This technique using dedicated radio resources, however, is one considered for the case where all the base stations use sector antennas, and is hard to apply to communication systems with beamforming characteristics applied thereto.

Further, in future layer cell environments, even more small cells than present would be installed, worsening interference. In such environments, the multi-cell cooperative technology using the dedicated radio resources may not produce sufficient performance. Further, where the number of small cells installed in the macro cell area is small, a corresponding small cell base station is not difficult to link via the wired backhaul to the network, but when small cells increase in number, they are difficult to link to the network. In this case, it would be much more advantageous to link small cells to the network via the wireless backhaul. However, since additional interference may arise where the wireless backhaul is to use mobile communication frequency, demanded is a scheme that carries out cooperative communications using the wireless backhaul given this. Relay technology which provides a wireless backhaul network in general 3GPP LTE allocates radio resources under the assumption that base stations and relays use sector antennas. Therefore, where relays and base stations all use beamforming antennas, the afore-mentioned wireless backhaul network-based relay technology has difficulty in securing an additional advance in performance via the technology, due to a failure to consider the beamforming characteristics.

Hence, the present disclosure proposes a method and device that performs cooperative communications by a plurality of base stations using beamforming antennas.

According to the present disclosure, there is proposed a method and device reducing the amount of interference information among neighbor base stations required upon cooperative communications to raise the performance of cooperative communications among the base stations in the mobile communication system using beamforming antennas.

The present disclosure also concerns a method and device that schedules a plurality of base stations that cooperatively communicate on a mobile communication system using beamforming antennas. Specifically, the present disclosure relates to a method and device that provides distributed cooperation among base stations using beamforming antennas on uplink, as well as on downlink. According to an embodiment of the present disclosure, base stations obtain downlink interferences from downlink interference rather than directly measuring from mobile stations. This may reduce a waste of radio resources for uplink interference.

According to the present disclosure, there is proposed a two-stage scheduling method and device to maximize the performance of cooperative communications among base stations over a mobile station which is on the move, when a delay occurs over the network.

The present disclosure also pertains to a cooperating method and device for beamforming base stations to cooperate in a layer cell environment where at least one small cell is installed in one macro cell area. In this case, what pertains is a scheduling method and device for transmitting and receiving signals in which the cell base stations and the wireless backhaul cooperatively transmit and receive signals when at least one small cell base station installed in the macro cell is linked to the network by performing wireless backhaul communication with the macro cell base station.

In an embodiment of the present disclosure, cooperative communications may encompass the cases where macro cell base stations using beamforming antennas perform cooperative communications while cooperating with each other or the cases where small cell base stations using beamforming antennas perform cooperative communications cooperatively with each other, as specific examples. Also included are the cases where a macro base station and at least one small cell base station communicate cooperatively in a layer cell environment where at least one small cell is installed in one macro cell area. It is assumed in a layer cell environment to which an embodiment of the present disclosure is applicable that the small cell performs wireless backhaul communications with the macro cell and is thus linked to the network. The macro cell base station is also assumed to have been connected to the network via the wired backhaul. A device which performs wireless backhaul communication functionality on macro cell base stations in a layer cell environment according to an embodiment of the present disclosure is defined as a hub node (HN). A device which performs wireless backhaul communication functionality on small cell base stations is defined as a remote backhaul node (RBN). Further, according to an embodiment of the present disclosure, the wireless backhaul takes into consideration the case where the macro cell and small cells use the same frequency and the case where they use different frequencies.

FIG. 1 showcases an example of a configuration of a layer cell providing a network connection according to an embodiment of the present disclosure.

Referring to FIG. 1, it is assumed, for example, that at least one small cell base station (SBS), e.g., an SBS1 120 and an SBS2 130, is installed in the service coverage 100 of a macro cell base station (MBS) 110 using beamforming antennas. It is shown that the HN 110a of the MBS 110 conducts wireless backhaul communications with the respective RBN 120a and RBN 120b of the SBS1 120 and SBS2 130, providing network connections. The HN 110 performs wireless backhaul communications with the two RBNs 120 and 130, providing network connections to the SBS1 120 and SBS2 130. The MBS 110 provides radio/wireless access for mobile communications to a mobile station (MS) 11 111. The SBS1 120 and SBS2 130, respectively, provide radio access for mobile camera modules to an MS21 121 and an MS31 131, respectively. Here, the wireless backhaul communications between the HN 110a and the RBN1 120a, or RBS2 130a, according to an embodiment, may use the same or different frequencies as the radio access for mobile communications between the MBS 110 and the MS11 111, mobile communications between the SBS1 120 and the MS21 121, or mobile communications between the SBS2 130 and the MS31 1313.

FIG. 2 is a view illustrating an embodiment for the structures of an antenna for radio backhaul and an antenna for radio access according to an embodiment of the present disclosure.

Referring to FIG. 2, an antenna structure 200a is shown such that an antenna 220a for wireless backhaul and an antenna 240a for radio access are implemented independently and separated from each other.

The antenna 1 structure 200a may be advantageous when some features among antenna-related information including use frequency, number of antennas and beams, antenna pattern or beam pattern, and vertical or horizontal direction of antenna differ for the antenna 220a for wireless backhaul and antenna 240a for radio access. An antenna structure 2 200b is a structure in which an antenna array 220b for wireless backhaul and an antenna array 240b for radio access are implemented on the same antenna hardware. In this case, the wireless backhaul antenna 220b and the radio access antenna 240b, although implemented on the same antenna hardware, have different antenna arrays and RF elements connected thereto. In such case, some of the features of the wireless backhaul antenna 220b and the radio access antenna 240b, e.g., use frequency or the number or directions of antennas, are the same, but the others, e.g., beam count, beam pattern, and beam direction, may differ. An antenna structure 3 200c is a structure for generating beams 222c and 224c for wireless backhaul and beams 242c and 244c for radio access via the same antenna hardware and array. The antenna structure 3 200c, although having the same antenna hardware and array, have its connected radio frequency (RF) elements independently implemented to generate different beams. In this case, nearly all of the antennas for wireless backhaul and radio access and beams are the same, but beams for wireless backhaul and beams for radio access may be chosen to differ.

Figure 3:
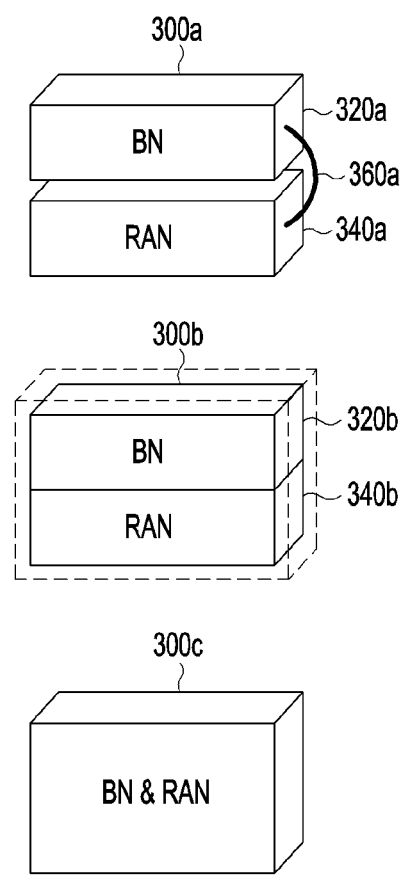
FIG. 3 is a view illustrating an embodiment for the installation structures of a backhaul node (BN) and an RAN according to an embodiment of the present disclosure.

FIG. 3 is a view illustrating an embodiment for the installation structures of a backhaul node (BN) and an RAN according to an embodiment of the present disclosure. Here, BN corresponds to HN or RBN, as set forth above, and RAN corresponds to MBS or SBS.

Referring to FIG. 3, in the structure denoted by reference number 300a, a BN 320a and a RAN 340a are implemented as devices independent from each other and are installed in different cases, boxes, housings, or racks. In this structure, the BN 320a and the RAN 340a are connected via a connection line or cable 360a. Although, in the structure denoted by reference number 300b, a BN 320b and a RAN 340b are implemented as devices independent from each other, they are installed in a single common case 300b. In the structure denoted by reference number 300b, e.g., a BN and a RAN are implemented in independent boards, installed in the same rack, and connected via a backplane. In the structure denoted by reference number 300c, a BN and a RAN are implemented as a single device. For example, in the structure denoted by reference number 300c, a RBN and a BS are implemented in the same board and are connected together via a bus.

Figure 4:
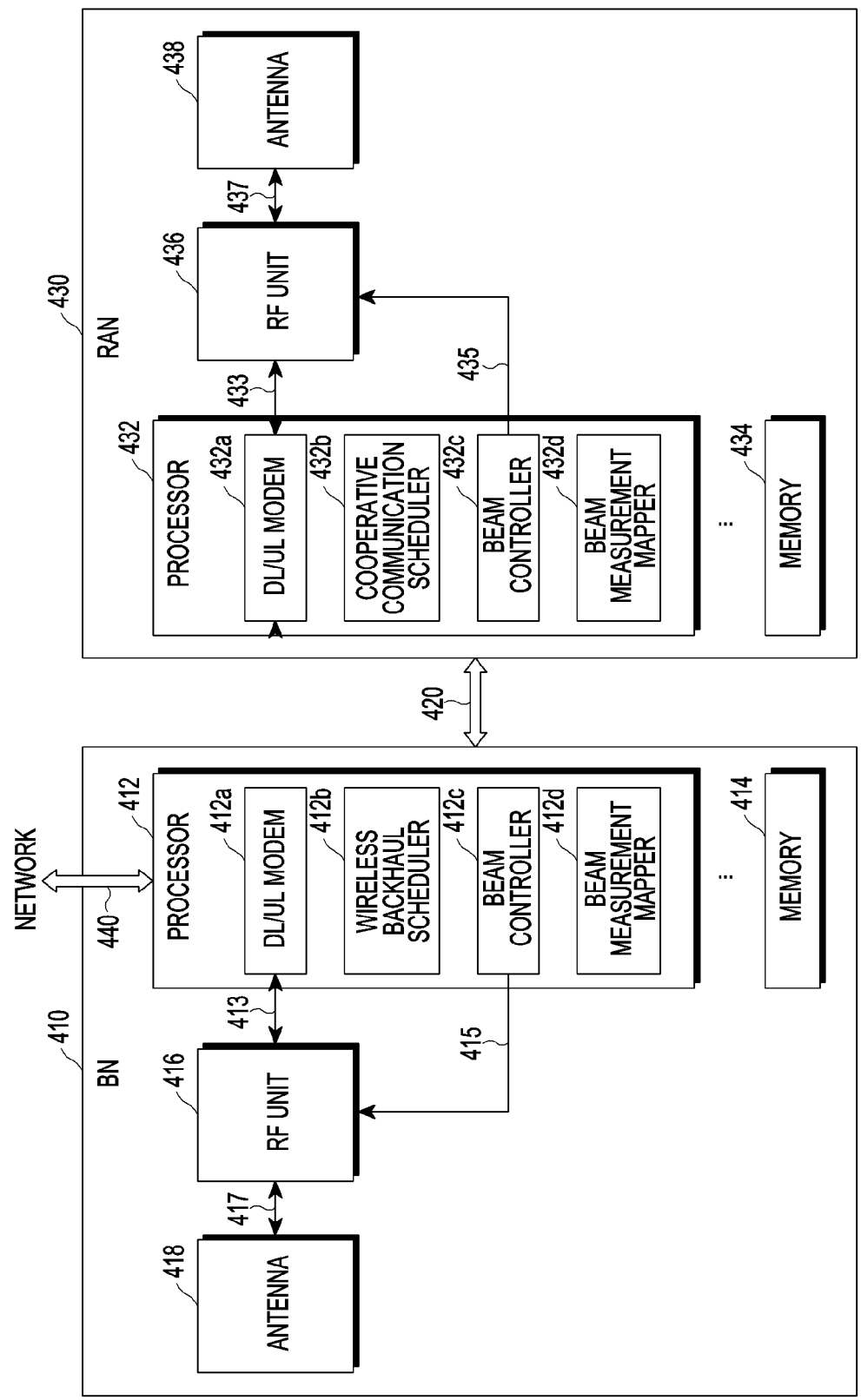
FIG. 4 is a view illustrating an example of a configuration of a BN and an RAN according to an embodiment of the present disclosure.

FIG. 4 illustrates an example of a configuration of a BN and an RAN according to an embodiment of the present disclosure. Here, the detailed configuration of BN and RAN has been proposed as an example for convenience purposes, the sub units constituting the corresponding units, according to an embodiment or the business provider's intention, may be integrated into a single unit or divided into sub units for more detailed features.

Referring to FIG. 4, a BN 410 corresponds to an HN or RBN as set forth above, and a RAN 430 corresponds to an MBS or SBS.

First, the BN 410 provides connectivity with network and connects with the RAN 430. Specifically, the BN 410 includes a processor 412, a memory 414, an RF unit 416, and an antenna 418. The processor 412 includes a DL/UL modem 412a, a wireless backhaul scheduler 412b, a beam controller 412c, and a beam measurement mapper 412d. The DL/UL modem 412a, according to an embodiment of the present disclosure, performs wireless backhaul communication functions on downlink and uplink, including transmissions and receptions of various wireless backhaul signals and control information and data for wireless backhaul. The wireless backhaul scheduler 412b performs the scheduling function of allocating wireless backhaul resources for wireless backhaul data. The beam controller 412c chooses a beam for transmission/reception of wireless backhaul signals and controls the chosen beam. The beam measurement mapper 412d measures interferences with the beams of neighbor cells per wireless backhaul and turn them into per-beam interference values according to an embodiment of the present disclosure. The memory 414 stores various wireless backhaul data and control information, signals, measurements, and interference values necessary for the processor 412 to operate. The processor 412 transmits and receives signals with the RF unit 416 via the DL/UL modem 412a and controls the operation of the RF unit 416 through the beam controller 412c. The RF unit 416 transmits and receives RF signals via the antenna 418. Here, the processor 412 selects a beam for transmitting and receiving signals via the antenna 418 and the RF unit 416 through the beam controller 412c, controls the selected beam, and performs resource allocation scheduling. The RF unit 416, although not shown in the drawings, adjusts, e.g., the transmit power, receive signal gain, or phase shifter phase value of the internal detailed circuitry, determining the beam pattern, i.e., beam shape and direction, for signals transmitted and received via the antenna 418. Where the antenna 418 has been determined to use a predetermined beam pattern, the predetermined beam pattern is assigned a beam number, and values of the detailed circuitry of the RF unit 416, i.e., power and phase-shifter's phase value, corresponding to each beam number, are previously generated and stored in the RF unit 416 or the memory 414. Where the RF unit 416 stores per-beam values of the detailed circuitry, the processor 412 may select a beam by letting the RF unit 416 know the corresponding beam number only. According to embodiments, the processor 412 may be implemented in hardware, in CPU and software, or in both hardware and software.

Next, the RAN 430 is connected with the BN 410, providing network connectivity to the mobile station. Specifically, the RAN 430 includes a processor 432, a memory 434, an RF unit 436, and an antenna 438. The processor 432 includes a DL/UL modem 432a, a cooperative communication scheduler 432b, a beam controller 432c, and a beam measurement mapper 432d. The DL/UL modem 432a, according to an embodiment of the present disclosure, performs downlink and uplink radio access communication functions, including transmissions and receptions of various radio access signals and control information and data for radio access. The cooperative communication scheduler 432b performs the scheduling function of allocating radio access radio resources for radio access data. In particular, the scheduling function of allocating radio resources for cooperative communications is performed according to an embodiment of the present disclosure. The beam controller 432c selects a beam of a base station to which to wirelessly access and controls the beam. The beam controller 432c selects the beam of the base station that provides best communications to each mobile station given channel characteristics. The beam measurement mapper 432d turns the interference values of neighbor base stations, which the mobile station has measured, into beam interference values of the neighbor base station for the selected base station beam. Further, the beam measurement mapper 432d induces the beam interference values of the neighbor base stations, per beam of the base station for uplink, based on the beam interference values of the neighbor base stations per beam of the base station for downlink. The memory 434 stores various data and control information for radio access, which are necessary for the processor 432 to operate, signals, channel measurements and interference measurements for the base station and mobile station, and neighbor cell radio resources and beam allocation information. The processor 432 is connected with the RF unit 436 via the DL/UL modem 432a, transmitting and receiving signals, and controls the RF unit 436 via the beam controller 432c. Then, the RF unit 436 is connected with the antenna 438 via the beam measurement mapper 437, transmitting and receiving RF signals. Similar to the RF unit 416 of the BN 410, the RF unit 436 may determine the beam pattern that is to be used in the antenna 438 and stores values of the detailed circuitry corresponding to the beam number indicating the beam pattern inside the RF unit 436 or in the memory 434. The processor 432 may be implemented in hardware, in CPU and software, or in both hardware and software, according to embodiments.

The BN 410 and the RAN 430 may be implemented in various structures as set forth above in connection with the structure of FIG. 3. The connection between the BN 410 and the RAN 430 may be a communication cable, a backplane connecting the boards corresponding to the BN 410 and the RAN 430, a bus connecting the chips in the same board, or a bus connecting parts in the same chip. The network connection 440 of the BN 410 may be implemented as a wired one, or a wireless one via another BN. For instance, where the BN 410 is an HN, and the network connection is provided via an RBN which is another wireless backhaul device, a multi-hop or wireless mesh network may be established. Where the BN 410 is an RBN, such network connection may be omitted.

According to an embodiment of the present disclosure, the layer cell environment-based scheduling technology may be implemented on the BN 412 and RAN 432 each, according to embodiments, or as necessary, all the functions for scheduling may be implemented via the processor of one of the BN 412 and RAN 432, and the results may be delivered to the other device, i.e., the BN 412 or RAN 432. According to another embodiment of the present disclosure, the layer cell environment scheduling technology are implemented in the HNs of the base station and wireless backhaul, but not in the RBN of the mobile station or wireless backhaul. In this case, the mobile station and wireless backhaul RBN provides the base station and HN with information including wireless communication channel and interference information necessary for the scheduler of the present disclosure to operate, which are obtained from the base station or HN. Further, where the RAN is connected to the network not via wireless backhaul but via wired backhaul, according to another embodiment of the present disclosure, in FIG. 4, the BN 410 does not perform separate operations, but the RAN 430 may instead be directly connected to the network.

According to an embodiment of the present disclosure, the cooperative communications among a plurality of base stations may lead to optimized cooperative communication performance by scheduling optimal radio resources given the wireless channel characteristics of the mobile station and user traffic every radio resource scheduling and data transmission/reception time interval. Specifically, according to an embodiment of the present disclosure, since the optimal beam is used every scheduling and data transmission/reception time interval and base stations carry out cooperative communications given beam interference characteristics, maximized cooperation effects may be achieved. According to an embodiment of the present disclosure, there is proposed a scheme that minimizes the amount of cooperation information which should be shared for cooperative communications and independently implements a scheduler per base station that performs cooperative communications to thereby ensure distributed cooperative communications. An embodiment of the present disclosure takes into account a layer cell environment. For ease of description, an MBS and a HN, as shown in FIGS. 3 and 4, are implemented in the same position and device, and their schedulers may be implemented to cooperate in real-time or as a single scheduler according to embodiments. According to an embodiment of the present disclosure, an SBS receives scheduling information of the MBS and HN and provides cooperative communications as per the scheduling information. At this time, this presents the benefit that the scheduling information delivered to the SBS is significantly reduced in amount as compared with performing cooperative communications in a centered scheme.

For cooperative communications over a plurality of base stations, the mobile station measures interference values based on signals received the serving base station and at least one neighbor base station. To maximize the performance of cooperative communications, each mobile station should make use of the interference values that the mobile station has measured in its current location. However, embodiments of the present disclosure are based on mobile communication systems considering the mobility of mobile station. Therefore, the receive power values measured on the interference signals the mobile station has received may be turned into per-beam interference values of the corresponding base station in order to reduce the waste of resources that occurs due to measuring, reporting, and sharing interferences whenever the mobile station moves. It is herein assumed that the base stations include a serving base station and at least one neighbor base station, each of which uses a plurality of beamforming antennas. Specifically, according to an embodiment of the present disclosure, a base station bundles the mobile stations using the same optimal beam into a single group upon communicating with the mobile stations located in its service coverage. According to an embodiment of the present disclosure, the base station may set a representative interference value per beam, based on the interference values of beam measurement (BM) signals that the mobile stations constituting the group have measured on each of the groups generated for each beam of the base station. According to an embodiment of the present disclosure, reporting the results of BM measurement by the mobile station may be performed as per predetermined periods or by receiving a BM measurement reporting command from the base station. The interference values considered upon setting the per-beam representative interference values, according to an embodiment, may be interference values received from all the mobile stations included in the groups generated per beam by the base station or interference values that are not less than a predetermined threshold among the interference values. As a specific example, the base station may receive interference values for a particular beam from all the mobile stations grouped for the particular beam on downlink, determine the representative interference value of the particular beam as the maximum, mean, or minimum value among the received interference values, and set the determined representative interference value as the interference value of the particular beam. Or, according to an embodiment, the base station may set, as the representative interference value of the particular beam, a value obtained by performing linear or non-linear computation on the received interference values.

Figure 5:
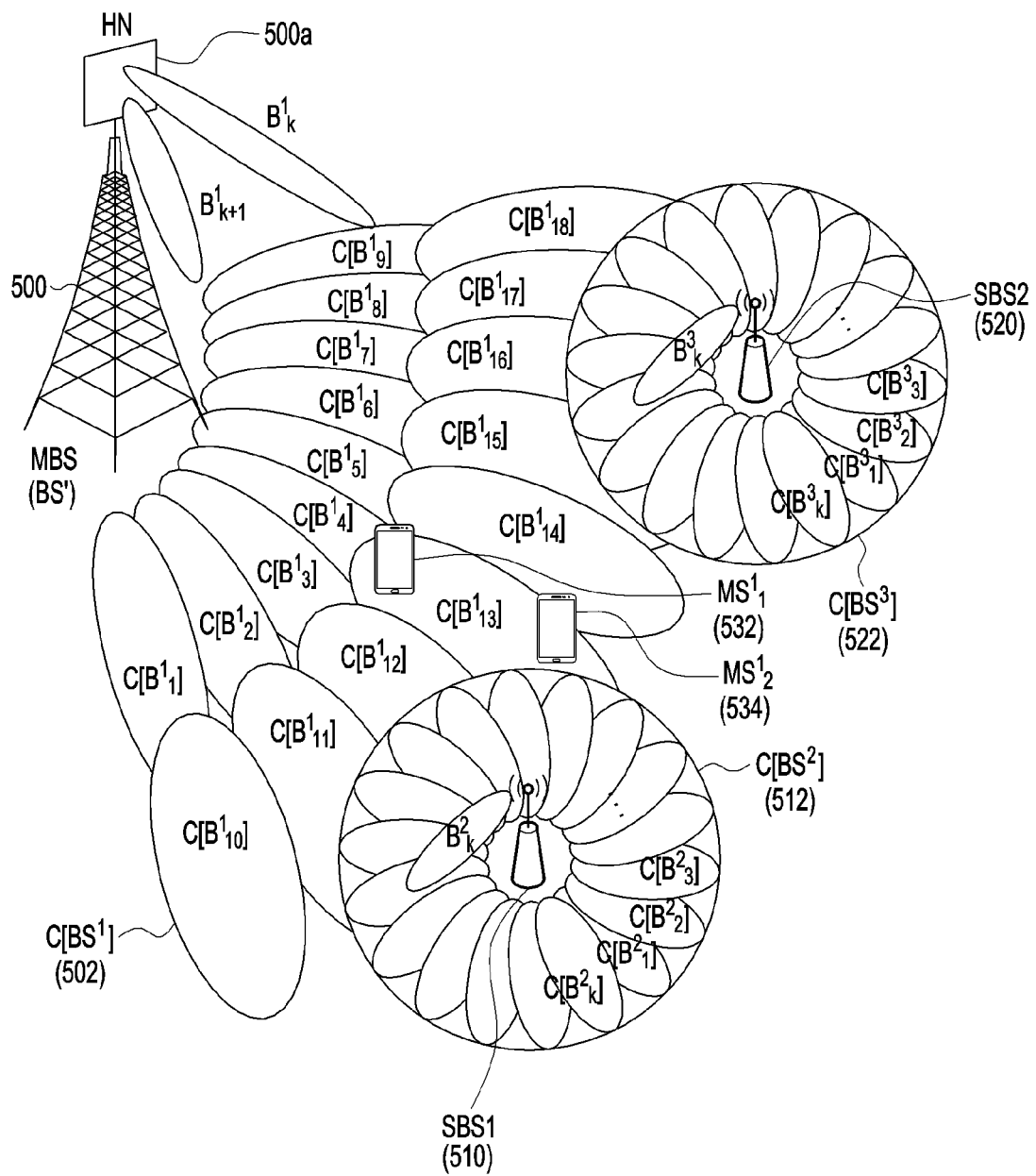
FIG. 5 is a view illustrating an example for per-beam interferences of a base station for distributed cooperative communications according to an embodiment of the present disclosure.

FIG. 5 is a view illustrating an example for per-beam interferences of a base station for distributed cooperative communications according to an embodiment of the present disclosure.

Referring to FIG. 5, an MBS (BS1, 500), an SBS1 (BS2, 510), and an SBS2 (BS3, 520) may perform downlink/uplink communications with mobile stations using their respective predetermined frequencies and may operate as serving base stations that provide network connectivity to the mobile stations. According to an embodiment of the present disclosure, the MBS 500, SBS1 510, and SBS2 520 each generates narrow beams, transmit signals to the mobile stations located in their service coverages, and receive signals from the corresponding mobile stations. As an example, FIG. 5 showcases the scenario where there are three base station identifiers n, which may be represented as $BS^n$, n=1, 2, 3, and under the assumption that the total number of beam identifier k is K in total per base station, the following representation may be made: $B_k^n$, k=1, 2, . . . , K. Based on the parameters representing such service coverage, base station identifiers, and per-base station beams, the area where the best quality of cooperative communications is provided on the mobile station in the corresponding location may be represented as $C[B_k^n]$. In the embodiment of FIG. 5, $C[BS^1]$(502), $C[BS^2]$(512), and $C[BS^3]$(522), respectively, denote the service coverages in which a $BS^1$(500), a $BS^2$(510), and a $BS^3$(520) provide the best communication quality via cooperative communications. According to an embodiment of the present disclosure, each base station periodically sends out BM signals to measure all of its transmit beams for downlink so as to use the optimal beam upon communications with mobile stations. Each mobile station measures receive power for all transmit/receive beam combinations with each base station based on the BM signals of the corresponding base station, which have been received via all of its receive beams. In this case, the BM measurement is targeted not only for the serving base station but also for neighbor base stations. Thereafter, such a scenario is assumed where the optimal transmit/receive beams for downlink are determined with the transmit beam which gives the maximum receive power per base station and its receive beam mapped thereto. According to an embodiment of the present disclosure, once the optimal transmit/receive beams are determined, the base station that has sent BM signals over the optimal transmit beam may be reselected as the serving base station. Each base station and mobile station perform downlink communications using the optimal transmit/receive beams.

FIG. 5 showcases the scenario where, as per an embodiment, two mobile stations ($MS_m^n$, where n is the base station identifier, and m is the mobile station identifier), i.e., an $MS_1^1$(532) and an $MS_2^1$(534), are located in the service coverage $C[BS^1]$ of the base station $BS^1$(500). At this time, the base station that has sent out the BM signal with the maximum receive power of the receive powers of the BM signals received by the $MS_1^1$(532) and $MS_2^1$(534) is assumed to be the $BS^1$(500). In this case, the $BS^1$(500) is chosen as the serving base station for the $MS_1^1$(532) and $MS_2^1$(534), providing network connections to the $MS_1^1$(532) and $MS_2^1$(534). Both the $MS_1^1$(532) and $MS_2^1$(534) are presently located in the area $C[B_{13}^1]$ where the beam $B_{13}^1$ of $BS^1$(500) is used and the beam of $BS^1$(500) that has sent out the BM signal with the maximum value of the receive powers of the BM signals received by the $MS_1^1$(532) and $MS_2^1$(534) is $B_{13}^1$. Accordingly, the base station $BS^1$(500) uses, as the optimal beam, $B_{13}^1$ upon downlink communications with the $MS_1^1$(532) and $MS_2^1$(534). Further, according to an embodiment of the present disclosure, the $MS_1^1$(532) and $MS_2^1$(534) each receive downlink signals from the neighbor base stations $BS^2$(510) and $BS^3$(520) using the optimal receive beam contained in the optimal transmit/receive beam combination determined for the serving base station $BS^1$(500) to support cooperative communications over the base stations and measures the downlink interference value ($I_{DL}$) that is represented as Equation 1 below:

$$I_{DL}(B_k^n \rightarrow MS_m^1) \qquad \text{[Equation 1]}$$

where, $MS_m^1$, m=1,2, and $B_k^n$, n=2,3 k=1, 2, . . . , K.

Further, the downlink interference values may be some, or a combination, of the receive power magnitude of the BM signal, i.e., interference signal, or the reference signal received power (RSRP) value of the interference signal, the reference signal received quality (RSRQ) of the interference signal, or the channel quality indication (CQI) value of the interference signal, or the receive power-to-nose power ratio of the interference signal, or the ratio of receive power of interference signal to receive signal power for optimal beam of serving base station, or the ratio of the reference signal receive power of interference signal to the reference signal receive power of optimal beam receive signal of the serving base station, according to embodiments.

Meanwhile, in order to prevent waste due to remeasurement and sharing processes for sharing interference information when the mobile station moves in the mobile communication environment, the per-base station beam interference values may be determined using the interference values of the neighbor base stations that the mobile station has measured, according to an embodiment of the present disclosure. Specifically, according to an embodiment of the present disclosure, mobile stations with the same optimal transmit beam used when the base station performs downlink communications with the mobile station are bundled into a single group. Per group, the representative interference value of the transmit beam of the base station mapped to the group is determined using the interference values measured by the mobile stations included in the group. The representative interference value is determined as the interference value of the transmit beam. According to an embodiment of the present disclosure, values obtained via various linear or non-linear calculations may be turned into the interference value of the transmit beam. Taking the embodiment of FIG. 5 as an example, since the $MS_1^1$(532) and $MS_2^1$(534) both are located in the area $C[B_{13}^1]$ of the beam $B_{13}^1$, the $BS^1$(500) uses the $B_{13}^1$ as the optimal transmit beam for downlink communications with the $MS_1^1$ (532) and $MS_2^1$(534). Hence, the $MS_1^1$(532) and $MS_2^1$(534) belong to the group of mobile stations with the beam $B_{13}^1$ as the optimal transmit beam. The interference value of $B_{13}^1$ is determined with the maximum, mean, or minimum value of the interference values by the $B_{13}^1$ of the $BS^1$(500), which have been measured by the mobile stations included in the group of $B_{13}^1$, or the resultant value obtained via various linear or non-linear calculations as the representative interference value, i.e., $I_{DL}(B_k^n \rightarrow B_{13}^1)$ for all the mobile stations included in the group of $B_{13}^1$ of $BS^1$(500). Likewise, the maximum, mean, or minimum value of the interference values by $B_k^n$ measured by the mobile stations included in the group $B_k^n$ for $B_k^n$ of $BS^n$, or the resultant value obtained by various linear or non-linear calculations is selected as the representative interference value for all the mobile stations included in the group of $B_k^n$ and is determined as the interference value of $B_k^n$. Resultantly, according to an embodiment of the present disclosure, the mobile stations with the same transmit beam of the base station are bundled into one group, and the representative interference value selected among the interference values by the beams of the neighbor cells which are received by all the mobile stations included in the group turns into the interference value of the transmit beam of the base station mapped to the group. For example, where the maximum value of the interference values measured by the mobile stations belonging to the group $B_{13}^1$ turns into the interference value of, or the mobile stations included in the group of $B_{13}^1$, this may be represented as shown in Equation 2 below:

$$I_{DL}(B_k^n \rightarrow B_{13}^1) \max_{m=1,2} I_{DL}(B_k^n \rightarrow MS_m^1) \quad \text{[Equation 2]}$$

where, n=2, 3, and k=1, 2, . . . , K, according to the embodiment of FIG. 5. Here, although the $MS_1^1$(532) and $MS_2^1$(534) are included in the group of the $B_{13}^1$, the actual location of the $MS_1^1$(532) is far away from the $BS^2$(510) and $BS^3$(520). Thus, the neighbor base stations, $BS^2$(510) and $BS^3$(520), relatively less interfere with the $MS_1^1$(532). In contrast, since the actual location of $MS_2^1$(534) is close to the $BS^2$(510), interference by the base station $BS^2$(510) relatively increases. Therefore, according to an embodiment of the present disclosure, where the neighbor base stations provide cooperative communications as per the $I_{DL}(B_k^n \rightarrow MS_m^1)$ measured by the mobile station included in the group of $B_{13}^1$, the $BS^2$(510) and $BS^3$(520) need not provide cooperative communications to the mobile station $MS_1^1$ (532), but the $BS^2$(510) needs to provide cooperative communications to the mobile station $MS_2^1$(534). Conversely, according to an embodiment of the present disclosure, where cooperative communications are presented based on the determined representative interference value, i.e., $I_{DL}(B_k^n \rightarrow B_{13}^1)$, the $BS^2$(510) should provide cooperative communications to both the $MS_1^1$(532) and $MS_2^1$(534) which belong to the group of $B_{13}^1$. As set forth above, according to an embodiment of the present disclosure, where the neighbor base stations cooperate based on the interference values measured per beam, if the $BS^1$(500) uses $B_{11}^1$, $B_{12}^1$, $B_{13}^1$, the $BS^2$(510) provides cooperative communications, and if the $BS^1$(500) uses beams $B_{15}^1$, $B_{16}^1$, $B_{17}^1$, $B_{18}^1$, the $BS^3$(520) provides cooperative communications. In conclusion, according to an embodiment of the present disclosure, the $BS^1$(500) selects the representative interference value of the group based on the interference values $I_{DL}(B_k^n \rightarrow B_b^1)$, n=2,3, by all the beams of each of the $BS^2$(510) and $BS^3$(520) measured by the mobile stations included in each corresponding group of all the beams ($B_b^1$), for each group of all the beams ($B_b^1$) of the $BS^1$(500) and determines the interference of each beam.

Likewise, the $BS^2$(510) and $BS^3$(520) each may measure interferences, i.e., $I_{DL}(B_k^n \rightarrow B_b^2)$, n=1,3 and $I_{DL}(B_k^n \rightarrow B_b^3)$, n=1,2, by other base stations for all their transmit beams on downlink, as does $BS^1$(500). The interference values measured are used to schedule the mobile station located in the service coverage. Given the scenario in which the wireless backhaul communicates at the same frequency as mobile communication radio access, interference values by the radio access base stations, i.e., MBS and at least one SBS, are measured per RBN, the interference values measured are delivered to the MBS and at least one SBS to allow the MBS and at least one SBS to provide cooperative communications to the wireless backhaul, or a representative interference value ($I_{DL}(B_k^n \rightarrow B_b^0)$, n=1, 2, 3) is selected per beam $B_b^0$ (where, b is the beam identifier of wireless backhaul) of wireless backhaul, determined as per-beam interference value, transferred to the base stations with the per-beam interference values, and the base stations may provide cooperative communications to the wireless backhaul based thereupon.

As described above, the method of measuring interference per beam as per an embodiment of the present disclosure is described in a further common way. On downlink, at least one mobile station, i.e., $MS_m^0$, located in the service coverage of the serving base station BSS, receives BM signals transmitted over the beam $B_k^n$ of the neighbor base station $BS^n$ using the optimal mobile station beam determined and the $BS^S$. The mobile station measures the interference value, i.e., $I_{DL}(B_k^n \rightarrow MS_m^0)$, for the BS signal and delivers the report for the result of the BM measurement including the measured interference value to the $BS^S$. At this time, reporting the result of BM measurement may be performed as per predetermined periods or upon receiving BM measurement report command requests from $BS^S$.

Then, the $BS^S$ determines the optimal beam for each mobile station on downlink using the interference value and receive power values obtained based on the result reports of the mobile stations, i.e., $MS_m^0$, that the $BS^S$ communicates with. For example, the mobile station may determine that the beam of the base station, which has sent the BM signal with the maximum receive power value, is the optimal beam for the mobile station on the downlink. Thereafter, when the optimal beam for the mobile stations communicating with the $BS^S$ is determined, the base station $BS^S$ bundles the mobile stations with the same optimal beam into one group. In such a manner, the $BS^S$ may obtain the group of the mobile stations having, as the optimal beam, the corresponding beam for all of its beams. The group $MS_{best}^s\{B_b^s\}$ of the mobile stations $MS_m^0$ for which the optimal beam with respect to the base station on the downlink has been determined as $B_b^n$ may be represented as shown in Equation 3 below:

$$M^s_{best}\{B^s_b\} = \{MS^s_m | B^s_{best}(MS^s_m) = B^s_b\} \quad \text{[Equation 3]}$$

where $B^s_{best}(MS_m^s)$, as the optimal beam of the $BS^S$ for the mobile station $MS_m^S$ on downlink, may be divided, for downlink and uplink, as follows: That is, $B^s_{best-DL}(MS_m^s)$ and $B^s_{best-UL}(MS_m^s)$, respectively, represent the downlink optimal beam and uplink optimal beam of the $BS^S$ for each $MS_m^S$, and $MS^s_{best-DL}\{B_b^s\}$ and $MS^s_{best-UL}\{B_b^s\}$ represents the groups of mobile stations for which the optimal beam of $BS_S$ is $B_b^s$ for the downlink and uplink, respectively. Hereinafter, where the equations or descriptions raise no question in carrying the concepts even without differentiating between downlink and uplink beams, the optimal beams or mobile station groups are not distinguished for downlink and uplink.

Thereafter, according to an embodiment of the present disclosure, the $BS^S$ determines its per-beam interference values using the interference values obtained from the mobile stations constituting the group. Specific operations for determining the interference values have been described above and are thus excluded from description. An example is assumed that the maximum of the interference values obtained per group is determined as the representative interference value. In this case, the value of interference of the beam $B_k^n$ of the base station $BS^s$ with the beam $B_k^S$ of $BS^n$ may be represented as shown in Equation 4 below:

$$I_{DL}(B_k^n \to B_b^s) = \max_{MS^s_{best}\{B_b^s\}} I_{DL}(B_k^n \to MS_m^s | MS_m^s \in M^s_{best}\{B_b^s\}) \quad \text{[Equation 4]}$$

As another example, the resultant value obtained by linear computation on the interference values obtained per group may be selected and determined as the representative interference value, which may be represented as shown in Equation 5 below:

$$I_{DL}(B_k^n \to B_b^s) = \Sigma_m w^s_{b,m} I_{DL}(B_k^n \to MS_m^s | MS_m^s \in M^s_{best}\{B_b^s\}) \quad \text{[Equation 5]}$$

Here, it is assumed that $w^s_{b,m}$ represents the predetermined weight for the interference values of the mobile stations $MS_m^s$ belonging to the group $M^s_{bestL}\{B_b^s\}$, and the condition $\Sigma_m w^s_{b,m} = 1$ is met. The linear computation in Equation 5 above means the mean of the interference values of $MS_m^s$, which have been multiplied by the weights, where the weights for the interference values are all the same and are M/1 where the number of mobile stations belonging to the group or the number of interference measurements by the mobile stations is M.

If $BS^S$ obtains the interference value, i.e., $I_{DL}(B_k^n \to B_b^s)$ for all the combinations of the beams $B_k^n$ of the neighbor base station $BS^n$ and its own beam $B_b^s$ as shown in Equations 4 and 5, it provides the obtained $I_{DL}(B_k^n \to B_b^s)$ to the $BS^n$.

As set forth supra, the representative interference value per beam of the base station, according to an embodiment of the present disclosure, represents an interference value that affects the mobile station on downlink. Where the transmit/receive antennas of the serving base station and the mobile station are implemented to have the same beam pattern, the transmit beam and receive beam with the same beam number may be assumed to have the same beam pattern. In this case, the per-beam interference values of the base station on downlink, according to an embodiment of the present disclosure, may also be used on uplink. In the state where the optimal transmit/receive beam combination has been determined, each mobile station transmits uplink signals via the determined optimal beam of the mobile station to the base station. Then, the serving base station also receives the uplink signals via the determined optimal beam of the base station to the mobile station. At this time, the uplink interference $I_{UL}(B^s_b \leftarrow B^n_k)$ received via the beam $B_b^s$ of $BS^S$ for the uplink signals transmitted from the $MS_m^s$ of the group using the beam $B_k^n$ of the neighbor base station $BS^n$ as the optimal beam may be obtained via the relation shown in Equation 6 below:

$$I_{UL}(B^s_b \leftarrow B^n_k) = I_{DL}(B^s_b \leftarrow B^n_k)(P_{MS}/P_s) \quad \text{[Equation 6]}$$

where $I_{UL}$ denotes the uplink interference, and $P_{MS}$ and $P_S$, respectively, denote the transmit power values of the corresponding mobile station and $BS^S$. More specifically, $I_{UL}(B^s_b \leftarrow B^n_k)$ is a value obtained by compensating the downlink interference $I_{DL}(B^s_b \to B^n_k)$ with the difference in transmit power between the mobile station and the $BS^S$, which may reflect the characteristic that the $BS^S$ may have different transmit powers depending on the type of base station, i.e., whether it is an MBS or SBS. That is, according to Equation 6 above, to obtain the uplink interference value $I_{UL}(B^s_b \leftarrow B^n_k)$ that $BS^S$ receives via $B_b^s$, the downlink interference value $I_{DL}(B^s_b \to B^n_k)$ obtained from the neighbor base station $BS^n$ is used. Hence, according to an embodiment of the present disclosure, in order for $BS^S$ to obtain the uplink interference value $I_{UL}(B^s_b \leftarrow B^n_k)$, the neighbor base station $BS^n$ delivers the downlink interference value to the base station $BS^S$, and $BS^S$ may calculate the uplink interference value as per Equation 6 above based on the downlink interference value. According to another embodiment, the neighbor base station $BS^n$ may calculate the uplink interference value as per Equation 6 and deliver the uplink interference value to the base station $BS^S$. Thus, according to an embodiment of the present disclosure, the serving base station need not measure uplink interferences by the mobile station and the neighbor base stations, reducing the waste of radio resources due to measurement of uplink interference values. Resultantly, according to an embodiment of the present disclosure, use of uplink interference values ensures significantly enhanced effects as compared with existing ones.

Tables 1 and 2 below represent per-beam representative interference values of base stations for downlink and uplink, respectively, according to an embodiment of the present disclosure.

TABLE 1

| $I_{DL}(B_k^2 \to B_b^1)$ | $B_1^1$ | $B_2^1$ | $B_3^1$ | $B_4^1$ | $B_5^1$ | ... | $B_{K1}^1$ |
|---|---|---|---|---|---|---|---|
| $B_1^2$ | 4.2 | 7.9 | 10.6 | 9.6 | 7.2 | ... | 3.2 |
| $B_2^2$ | 5.8 | 9.3 | 12.5 | 11.9 | 6.8 | ... | 2.8 |
| $B_3^2$ | 6.1 | 11.9 | 11.3 | 8.9 | 5.5 | ... | 1.1 |
| ... | ... | ... | ... | ... | ... | ... | ... |
| $B_{K2}^2$ | 1.1 | 4.1 | 6.7 | 7.3 | 9.8 | ... | 0.9 |

First, Table 1 showcases an example of the result obtained by representing the per-beam interference values of $BS^1$ as per-beam interference values of $BS^2$ by way of one of the schemes described above in connection with Equation 1, Equation 4, or Equation 5 when the $BS^2$, which is an neighbor base station on downlink, sends out BM signals via $B_k^2$, k=1, 2, 3, ... K2, and the BS1, which is the serving base station, receives the BM signals via the beam $B_k^2$, k=1, 2, 3, ... K2, of BS2 per group $M^s_{best}\{B_b^1\}$ configured for each beam $B_b^1$, b=1, 2, ..., K1. Here, the interference values mapped to each table are dB values obtained by allowing the mobile stations included in the group $M^s_{best}\{B_b^1\}$ to receive the BM signals, which $BS^2$ has sent $B_k^2$, k=1, 2, 3, ... K2, and calculating the interference power-to-noise power ratio for the received BM signals. Here, since the corresponding mobile station includes its noise alongside the BM signal, the interference power-to-noise power ration (Interference to Noise Ratio: INR) may be calculated as shown in Equation 7:

$$INR = \frac{\sigma_y^2}{\sigma_n^2} - 1 \qquad \text{[Equation 7]}$$

Here, $\sigma_y^2$ denotes the power of the BM signal that the mobile station has received from the neighbor base station, and $\sigma_n^2$ denotes the noise power of the mobile station.

Further, $BS^1$ receives beam measurement signals that other neighbor base stations, i.e., $BS^3$, $BS^4$, ..., have sent via their respective beams, and each generate the downlink interference $I_{DL}(B^3_k \rightarrow B^1_b)$, $I_{DL}(B^4_k \rightarrow B^1_b)$, ... as shown in Table 1 above. Further, the neighbor base stations may also receive the BM signals that all their neighbor base stations have sent out, per beam, and represent interference values. At this time, if each base station is previously aware of the noise figure value of the mobile station, it may obtain the actual dBm value of its noise signal power $\sigma_n^2$ through a simple computation. Hence, an embodiment may generate the per-beam interference values of the base station on downlink, not only as interference power-to-noise power ratios as shown in Table 1, but also as dBm values of interference power in the unit frequencies or whole frequency bandwidth, or represent in many other ways.

TABLE 2

| $I_{UL}(B_k^2 \leftarrow B_b^1)$ | $B_1^1$ | $B_2^1$ | $B_3^1$ | $B_4^1$ | $B_5^1$ | ... | $B_{K1}^1$ |
|---|---|---|---|---|---|---|---|
| $B_1^2$ | −5.8 | −2.1 | 0.6 | −0.4 | −2.8 | ... | −6.8 |
| $B_2^2$ | −4.2 | −0.7 | 2.5 | 1.9 | −3.2 | ... | −7.2 |
| $B_3^2$ | −5.9 | 1.9 | 1.3 | −1.1 | −4.5 | ... | −8.9 |
| ... | ... | ... | ... | ... | ... | ... | ... |
| $B_{K2}^2$ | −8.9 | −5.9 | −3.3 | −2.7 | −0.2 | ... | −9.1 |

Table 2 above represents an embodiment of the results of obtaining the uplink interference value $I_{UL}(B^2_k \leftarrow B^1_b)$ from the per-beam downlink interference value of base station. Here, the per-beam uplink interference values of the base station represents the results obtained as, when each mobile station included in the group $M^s_{best}\{B_b^1\}$ for each of the beams $B_b^1$ of $BS^1$ sends the uplink signal, the interference power-to-noise power ratio (dB value) of the uplink signal that $BS^2$ receives via each beam $B_k^2$ is obtained from the per-beam downlink interference value of the base station in Table 1. It is here assumed that the transmit power of $BS^2$ is 30 dBm, and the transmit power of the mobile station is 20 dBm so that the transmit power ratio of $BS^2$ and mobile station, i.e., $P_{MS}/P_s$ is 10 dB. Also assumed is that the noise figure between $BS^2$ and mobile station is the same and so is noise power. Further, from the downlink interference values $(I_{DL}(B^3_k \rightarrow B^1_b), I_{DL}(B^4_k \rightarrow B^1_b), ...)$ mapped per beam of each of the other base stations, i.e., $BS^3$, $BS^4$, ..., in Table 1 above, $BS^1$ may obtain the uplink interference value $I_{UL}(B^3_k \leftarrow B^1_b)$. $I_{UL}(B^4_k \leftarrow B^1_b)$, ... for $BS^3$, $BS^4$, ....

Although not shown in Table 2, the other base stations may also obtain per-beam uplink interference values from the downlink interference values by their neighbor base stations.

In the method of measuring per-beam downlink interference values and uplink interference values of base station according to an embodiment of the present disclosure, as the base station beam narrows, the measured interference value becomes more accurate and precise, thus increasing the performance of cooperative communications with neighbor base stations. Therefore, embodiments of the present disclosure may raise the performance of future layer cell environment mobile communication system that communicates using narrow beams.

In mobile communication environments, mobile stations may frequently be relocated while base stations remain stationary. Thus, according to an embodiment of the present disclosure, per-beam interference values of a base station are basically fixed values and do not need frequently re-measure and re-share with neighbor base stations for cooperative communications. Short-term channel characteristics may be varied by objects that move around the base station, and differences may exist in the positions where the corresponding mobile station has measured interference values. However, the long-term channel characteristics between base stations do not vary.

Meanwhile, an embodiment of the present disclosure may additionally reduce the amount of information about the per-beam interference values of base station. For example, the neighbor base stations that have sent BM signals larger in interference value per beam of each base station than a predetermined threshold may be screened, and the per-beam interference values of the corresponding base station may be delivered to only the base stations screened. Further, an additional reduction may be achieved in the amount of information about the interference values by reducing the number of bits indicating the per-beam interference value of base station.

According to an embodiment of the present disclosure, the measurement of per-beam interference values of base station may install the corresponding base station, according to an embodiment, obtain during a test period, and share the same with all the base stations. A request for BM measurement report may be sent to the mobile stations, as necessary, during a communication service, the per-beam interference values of base station are updated, or may be updated as per predetermined periods. According to an embodiment of the present disclosure, whenever modifying per-beam interference values, each base station may deliver the modified per-beam interference values to neighbor base stations and share the modified per-beam interference values with the neighbor base stations. According to an embodiment of the present disclosure, the per-beam interference values measured and shared for cooperative communications among base stations are for reflecting the long-term communication channel characteristics of a stationary base station, which eliminates the need to frequently modify interference values and deliver for sharing with the neighbor base stations.

Figure 6A:
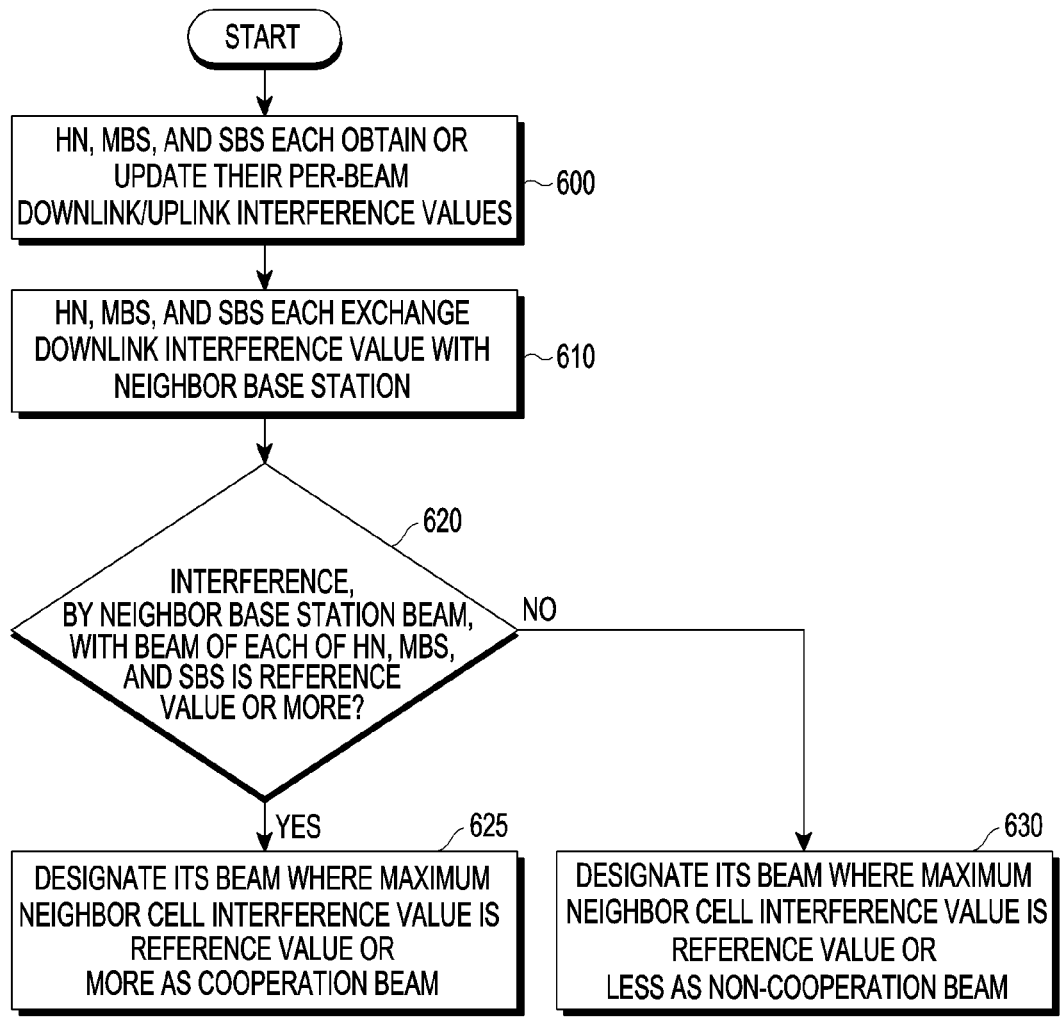
FIG. 6a is a flowchart illustrating an example of the operation of classifying beams of a base station according to an embodiment of the present disclosure.

FIG. 6a is a flowchart illustrating an example of the operation of classifying base stations by a base station according to an embodiment of the present disclosure. As an example, a layer cell environment is based where at least one SBS is installed in a wireless backhaul, MBS, and the service coverage of the MBS. Here, the base station may be an MBS or SBS.

Referring to FIG. 6a, in step 600, the serving base station $BS^S$ of each cell obtains an interference value by the beam $B_k^n$ of each of at least one neighbor base station BS" per beam $B_b^s$ of $BS^S$. Here, the serving base station corresponds to one of a HN, MBS, and SBS, according to an embodiment. Here, the per-beam interference value of base station may be obtained or updated as per a BM measurement report request sent as per the need of the serving base station or as per predetermined periods. According to an embodiment of the present disclosure, for the per-beam interference value of base station, the downlink interference value $I_{DL}(B_k^n \rightarrow B_b^s)$ is determined as the representative interference value among interference values BM-measurement reported by at least one mobile station included in the group mapped to the corresponding beam on downlink, and the uplink interference value $I_{UL}(B_k^n \leftarrow B_b^s)$ is determined from the downlink interference value.

Figure 6B:
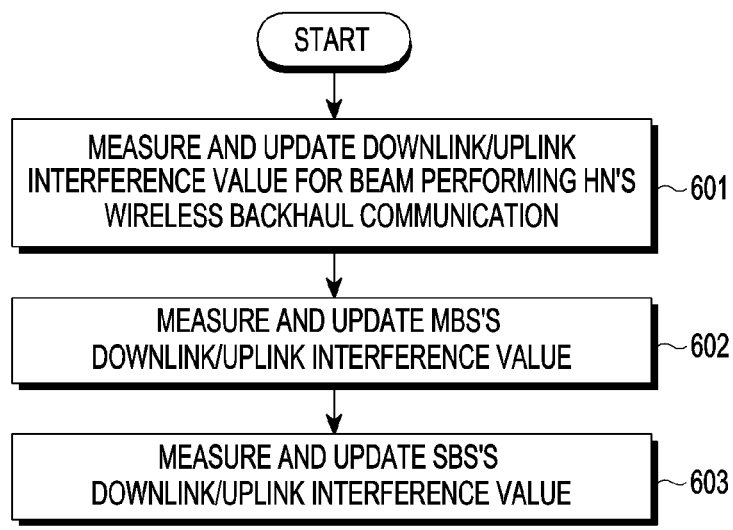
FIG. 6b is a flowchart illustrating an example of the detailed operation of step 600 of FIG. 6a which is a procedure for obtaining per-beam interference values by a base station.

FIG. 6b is a flowchart illustrating an example of the detailed operation of step 600 of FIG. 6a which is a procedure for obtaining per-beam interference values by a base station. Here, although the procedures of measuring and updating downlink and uplink interference values of HN, MBS, and SBS are described in order for ease of description, the measurement and updating of interference values of each node may be performed regardless of order.

Referring to FIG. 6b, according to an embodiment, an environment is assumed where a wireless backhaul exists. In this case in step 601, the FIN measures interference values by MBS and SBS for beam $B_b^s$ of HN which is used for wireless backhaul communications via RBN that the HN communicates with, and the HN obtains and updates the downlink interference value $I_{DL}(B_k^n \rightarrow B_b^s)$, which is received via the beam $B_b^s$ of the HN used for wireless backhaul communications per beam $B_k^n$ of BS" corresponding to the MBS or SBS. In measuring and updating the downlink interference value for the beam used for the HN's wireless backhaul communications, updating is conducted as necessary or as per predetermined periods. And like the base station, the uplink interference value $I_{UL}(B_k^n \leftarrow B_b^s)$ may be obtained from the downlink interference value as per Equation 6 above.

In step 602, the MBS, i.e., $BS^S$, receives interference values received from each of the beams $B_k^n$ of BS", the SBS, and the beam used for wireless backhaul communications by the HN from at least one mobile station included in the group on the downlink, per group set for each of all its beams $B_b^s$. And based on the interference values, the MBS determines the representative interference value for each beam $B_b^s$ as the downlink interference value $I_{DL}(B_k^n \rightarrow B_b^s)$ of the corresponding beam or updates it. The determining and updating of per-beam downlink interference values by the MBS may be performed as per predetermined periods or at times needed by the MBS. The MBS uses the downlink interference value for each beam $B_b^N$ of the MBS as per Equation 6 above, obtaining the uplink interference value $I_{UL}(B_k^n \leftarrow B_b^s)$ for each beam $B_b^s$ of the MBS.

In step 603, the SBS receives interference values measured for the beams of the MBS and the beam of the HN via which wireless backhaul communications are performed among the beams of the HN by at least one mobile station constituting the group set for each of its beams $B_b^s$, and the SBS determines the representative value for its beam $B_b^s$ as downlink interference value $I_{DL}(B_k^n \rightarrow B_b^s)$ or updates. The determining and updating of per-beam downlink interference values by the SBS may be performed as per predetermined periods or at times needed by the SBS. The SBS uses per-beam downlink interference values of the SBS as per Equation 6, obtaining per-beam uplink interference values $I_{UL}(B_k^n \leftarrow B_b^s)$ of the SBS.

In step 610 of FIG. 6a, according to an embodiment of the present disclosure, the HN, MBS, and SBS exchange and share, with neighbor base stations, the downlink interference values and uplink interference values obtained via steps 601 to 603 of FIG. 6b. Here, the exchanging operation is conducted as necessary or periodically. According to an embodiment, the downlink interference values and uplink interference values may be exchanged, converted so that the amount of the information is reduced. Or, according to an embodiment of the present disclosure, the HN, MBS, and SBS may exchange only the downlink interference values and interference values obtained from each mobile station and obtain the uplink interference values as per Equation 6 above. According to an embodiment of the present disclosure, the HN, MBS, and SBS may exchange, and share with neighbor base stations, their respective downlink reference values and uplink reference values.

In operation 620, the HN, MBS, and SBS compare their per-beam downlink interference values and uplink interference values, which have been exchanged and shared, with the downlink reference value and uplink reference value obtained in step 610. As a result of the comparison, where the interference values by the neighbor base station beams for the corresponding beams on the downlink and uplink are equal or larger than the reference value as shown in Equations 8 and 9, the HN, MBS, and SBS, each, set the corresponding beams as cooperation beams in step 625. As a result of the comparison, where the interference values by the neighbor base station beams for the corresponding beams on the downlink and uplink are smaller than the reference value as shown in Equations 8 and 9, the HN, MBS, and SBS, each, set the corresponding beams as non-cooperation beams in step 630. As set forth in Equations 8 and 9, the operations of setting the cooperating beams and non-cooperation beams in FIG. 6a are conducted on the downlink and uplink, respectively. According to an embodiment of the present disclosure, the cooperation beam and non-cooperation beam are defined as a beam via which at least one neighbor base station is to provide cooperative communications for a corresponding base station, and a beam via which it is not.

[Equation 8]
$$B_b^s = \begin{bmatrix} DL \text{ Cooperation Beam}, & \text{if } \max_{n,k} I_{DL}(B_k^n \rightarrow B_b^s) > I_{NC \rightarrow SC} \\ \text{Non-Cooperation beam}, & \text{otherwise} \end{bmatrix}$$

[Equation 9]
$$B_b^s = \begin{bmatrix} UL \text{ Cooperation Beam}, & \text{if } \max_{n,k} I_{UL}(B_s^b \leftarrow B_n^k) > I_{SC \leftarrow NC} \\ \text{Non-Cooperation beam}, & \text{otherwise} \end{bmatrix}$$

where $I_{NC \rightarrow SC}$ and $I_{SC \rightarrow NC}$, are the downlink reference value and uplink reference value for setting the cooperation beam/non-cooperation beam as per an embodiment, and SC is the abbreviation of serving cell, and NC is the abbreviation of neighbor cell. And, $I_{DL}(B_k^n \rightarrow B_b^s)$ and $I_{UL}(B_b^s \leftarrow B_k^n)$, respectively, note the downlink interference value and the uplink interference value that arise from the beam $B_k^n$ of the neighbor base station $B_s^n$ for the beam $B_b^s$ of the serving base station.

According to an embodiment of the present disclosure, neighbor base stations of each base station cooperate over cooperation beams that the base station has set. At this time, where "interference avoidance interference reduction cooperation" is performed where interference by the neighbor base station is set to be smaller than a predetermined reference, each base station may deliver the interference reference value by its desired neighbor base station to its neighbor base stations. Then, the neighbor base stations chose beams where the interference with the cooperation beam of the corresponding base station is smaller than the interference reference value and cooperate with the corresponding base station. In comparison, according to an embodiment of the present disclosure, cooperation among the neighbor base stations of each base station is not required for non-cooperation beams set by the base station.

According to an embodiment of the present disclosure, for cooperative communications of neighbor base stations per beam of the serving base station, the serving base station may deliver the downlink reference value and uplink reference value to the neighbor base stations in the interference value exchange procedure, e.g., step 610 of FIG. 6a, for cooperative communications. And the serving base station, according to an embodiment of the present disclosure, may adjust the downlink reference value and uplink reference value, adjusting the magnitude of interference with the base station, per beam, from the neighbor base stations.

In the case of embodiments where wireless backhaul exists, the MBS and SBS, as per an embodiment of the present disclosure, limit their beams $B_b^s$ to allow the downlink interference value $I_{DL}(B^s_b \rightarrow B^o_k)$ and uplink interference value $I_{UL}(B^o_k \leftarrow B^s_b)$, which arise via $B_k^o$ for performing wireless backhaul communications of HN, to be smaller than the predetermined downlink reference value $I_{RA \rightarrow BH}$ and uplink reference value $I_{BH \leftarrow RA}$, able to provide cooperative communications upon wireless backhaul communications. Accordingly, the HN may deliver its desired $I_{RA \rightarrow BH}$ and $I_{BH \leftarrow RA}$ values (where RA stands for radio access, and BH stands for backhaul) in the interference value exchange procedure with the MBS and SBS, allowing them to be shared, and may adjust the downlink reference value and uplink reference value to adjust the magnitude of interference with each of its beams from the neighbor base stations.

As set forth above, according to an embodiment of the present disclosure, cooperation beam and non-cooperation beam are distinguished per beam of each base station based on the downlink reference value/uplink reference value, ensuring that the beams of the corresponding base station which are to perform cooperative communications with the neighbor base stations are classified. Thus, an embodiment of the present disclosure may enable distributed cooperative communications via cooperation among neighbor base stations on the beams of each base station.

Meanwhile, according to an embodiment of the present disclosure, the serving base station, upon transmitting and receiving data with the mobile station, allocate a radio resource region to be used for cooperative communications with the neighbor base stations, determine cooperation beams of the serving base station based on the downlink/uplink interference values set forth above, and delivers cooperation information containing information about the radio resource region and cooperation beams to the neighbor base stations. Then, according to an embodiment of the present disclosure, the neighbor base stations, which have received the cooperation information, determine radio resources and beams of neighbor base stations to be used upon cooperative communications with the serving base station based on the per-beam downlink/uplink reference values of the serving base station, the radio resource region, and information about the cooperation beams of the serving base station, and provide cooperative communications to the serving base station using the determined beams and radio resources. Here, where the neighbor base stations provide interference avoidance interference reduction cooperation, it may choose the beam that may minimize interference with downlink or uplink communications with the mobile station located in the service coverage of the serving base station or maximize data transmission speed among the beams of the neighbor base stations having the interference values smaller than the downlink/uplink reference values received from the serving base station. According to another embodiment of the present disclosure, the neighbor base stations may provide joint transmission in which it chooses the beam of the neighbor base station, which presents the maximum interference value for the mobile station located in the serving base station, and transmits data to the same mobile station simultaneously with the serving base station via the chosen neighbor base station beam. Hence, the serving base station may select its desired method for cooperation with neighbor base stations between, e.g., interference avoidance interference reduction cooperation or joint transmission and additionally notify the neighbor base stations of the same.

Where a time delay occurs on the network under the context where distributed cooperative communications are provided according to an embodiment of the present disclosure, the performance of distributed cooperative communications may be deteriorated, and a problem arise in the beamforming operation of the corresponding base station.

Figure 7A:
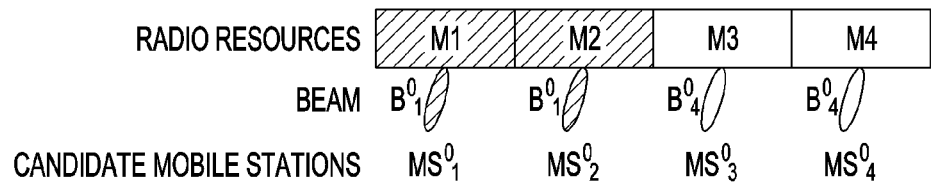
FIGS. 7a to 7c are views illustrating examples of scheduling for distributed cooperative communications according to an embodiment of the present disclosure.
Figure 7B:
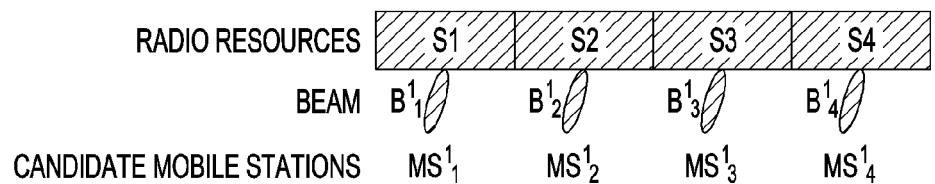
Figure 7C:
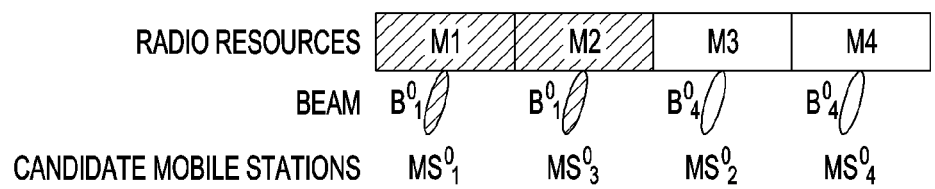

FIGS. 7a to 7c are views illustrating examples of scheduling for distributed cooperative communications according to an embodiment of the present disclosure.

Referring to FIG. 7a, according to an embodiment of the present disclosure, it is assumed that the optimal beams of $BS^0$, an example of the serving base station, which it is to use upon communications with a total of four mobile stations $MS_1^0$, $MS_2^0$, $MS_3^0$, and $MS_4^0$ located in the service coverage $BS^0$ at the current moment are determined as $B_1^0$, $B_1^0$, $B_4^0$ and $B_4^0$. In this case, according to an embodiment of the present disclosure, $BS^0$ allocates the mobile stations with the per-beam radio resources $M_1$, $M_2$, $M_3$ and $M_4$, where data is to be transmitted, using the beams $B_1^0$, $B_1^0$, $B_4^0$ and $B_4^0$. $BS^0$ delivers, the neighbor base station $BS^1$, the cooperation information of $BS^0$ containing the per-beam radio resources allocated as above and optimal beam information mapped thereto, to the neighbor base station $BS^1$, allowing the information to be shared.

Referring to FIG. 7b, according to an embodiment of the present disclosure, $BS^1$, which is an example neighbor base station, receives the cooperation information of $BS^0$ at $T_L$ (L>0) after time $T^0$, allocates radio resources $S_1$, $S_2$, $S_3$ and $S_4$ to be used for cooperative communications with $BS^0$ and the beam $B_1^1$, $B_2^1$, $B_3^1$, and $B_4^1$ for each radio resource, and sends data t the mobile stations at time $T_{L+1}$ using the allocated radio resources and the beams of $BS^1$.

Meanwhile, it is assumed that, where $MS_1^0$, $MS_2^0$, $MS_3^0$, and $MS_4^0$ located in the $BS^0$ service coverage moves during the course of the scheduling in which the cooperation information of $BS^0$ is delivered to $BS^1$, and the radio resources allocated by $BS^1$ and the beams of $BS^1$ are allocated, the $BS^0$ optimal beam allocated to $MS_1^0$, $MS_2^0$, $MS_3^0$, and $MS_4^0$ changes to, e.g., $B_1^0$, $B_4^0$, $B_1^0$ and $B_4^0$. At this time, where $BS^0$ uses, rather than the optimal beam changed upon communication with $MS_1^0$, $MS_2^0$, $MS_3^0$, and $MS_4^0$, the optimal beam allocated in FIG. 7a, a performance deterioration may arise. At this time, as the time delay $T_L$ occurring on the network increases, the performance deterioration increases as well. The time delay $T_L$ occurring on the network, although varying depending on the performance and structure of the network, may reach up to a few tends to a few hundreds of ms. Further, where the transition in the optimal beam occurs between the beam towards the line of sight (LOS) and the beam towards the non-LOS (NLOS) or between the beam towards one NLOS and the beam towards another NLOS, a delay in the beam variation may greatly increase the performance deterioration. Further, where a beam transition occurs from the optimal beam allocated in FIG. 7a, it is difficult to achieve the performance desired by the radio resources and optimal beam allocated by $BS^1$ in FIG. 7b, which have been allocated based on the cooperation information as shown in FIG. 7a.

Hence, according to an embodiment of the present disclosure, scheduling by the serving base station $BS^0$ is performed in two steps. First, $BS^0$ chooses a candidate mobile station using the beam optimal for each mobile station in the first step of scheduling and allocates radio resources and optimal beam of $BS^0$, without definitely determining the mobile station. And according to an embodiment of the present disclosure, $BS^0$ delivers the results of the first-step scheduling to $BS^1$, which is an example neighbor base station, as cooperation information, allowing the same to be shared, and immediately before transmitting and receiving data with the mobile station, $BS^0$ performs the second-step scheduling to determine mobile stations with which to perform cooperative communications and $BS^0$ radio resources and optimal beam allocated finally for each mobile station.

In a specific example, referring to FIG. 7c, $BS^0$ determines the radio resources $M_1$, $M_2$, $M_3$ and $M_4$, beams $B_1^0$, $B_1^0$, $B_4^0$ and $B_4^0$, which have been allocated by the second-step scheduling, and the final mobile stations, i.e., $MS_1^0$, $MS_3^0$, $M_2^0$ and $MS_4^0$ mapped thereto, and sends data to each of $MS_1^0$, $MS_3^0$, $MS_2^0$ and $MS_4^0$ determined using the optimal beam and radio resources allocated by the first-step scheduling. In an embodiment of the present disclosure, as shown in FIG. 7c, the serving base station re-performs scheduling for cooperative communications immediately before transmitting and receiving data to/from the mobile station, finally determining the mobile station to which to indeed send data, thereby able to reflect the cases where the optimal beam of $BS^0$ allocated to the corresponding mobile station in the first-step scheduling is changed due to the movement of the mobile stations after the first-step scheduling. Resultantly, according to an embodiment of the present disclosure, the two-step scheduling for distributed cooperative communications as per an embodiment of the present disclosure may raise communication performance by choosing the optimal beam at the time of data transmission without limitations on the switch of optimal beams for the serving base station due to the movement of mobile station. This ensures additional effects in which the algorithm and device for beam transitions are independently operated, implemented, and verified without influencing the algorithm and device for scheduling of cooperative communications. As a result, the two-step scheduling according to an embodiment of the present disclosure enables the serving base station to achieve the optimal performance for cooperative communications with neighbor base stations as well as transmission, to the mobile stations, of data using the optimal beam all the time.

FIG. 8 is a view illustrating an example of distributed cooperative communications which are performed with two neighbor base stations in an environment where a time delay occurs on a network according to an embodiment of the present disclosure. It is assumed herein that the serving base station 810 performs scheduling for cooperative communications at every transmit time interval (TTI) $T_L$ and transmits and receives data. Assumed in this case is that a time delay ($T_L$, L>0) for transfer of cooperation information between base stations occurs so that a neighbor base station 1 820 receives, at TTI, $T_L$, the cooperation information allocated by the serving base station 810 at the time interval $T_L$ to perform scheduling for cooperative communications and performs cooperative communications with the serving base station 810 at TTI, $T_{L+1}$. Here, the serving base station 810 and the neighbor base station 820 are MBSs adjacent each other or may mean one MBS and an SBS installed inside the MBS, or both may be SBSs.

For ease of description, the embodiment of FIG. 8 may be described with three time intervals separated which include two time intervals before the time interval when cooperative communications are performed. In this case, the three time intervals may be defined as a cooperation information scheduling interval during which radio resources and beams are allocated for cooperative communications at $T_0$ for the operation of the serving base station 810 according to the present disclosure, $T_L$ may be defined as a mobile station and data scheduling interval during which a mobile station to perform cooperative communications and data are allocated, and $T_{L+1}$ may be defined as a cooperative communication interval during which cooperative communication is indeed carried out.

First, as an example of a neighbor base station at $T_{L+1}$, the serving base station 810 for performing cooperative communications with the neighbor base station 1 820 may be operated as follows.

$T_0$: Cooperation Information Scheduling Interval

Referring to FIG. 8, at $T_0$, the serving base station 810 performs first-step scheduling, according to an embodiment of the present disclosure, in step 811, allocating a radio resource region for cooperative communications with a neighbor base station, e.g., the neighbor base station 1 820 and beams to be used in the radio resource region for the downlink and uplink. In step 812, the serving base station 810 delivers, to the neighbor base station 1 820, the cooperation information containing the radio resource region allocated in the first-step scheduling and information about the beam mapped thereto. And, the serving base station 810 may conduct, at $T_0$, the second-step scheduling for the first-step scheduling which has been performed at the previous time interval. Meanwhile, the neighbor base station 1 820 may receive cooperation information via the first-step scheduling which has been performed at the previous time interval, able to perform cooperation scheduling accordingly.

$T_L$: Mobile Station and Data Scheduling Interval

At $T_L$, the serving base station 810 performs the second-step scheduling, according to an embodiment of the present disclosure, allocating a mobile station with which to perform cooperative communications and data in step 813. Specifically, in the second-step scheduling, the second-step scheduling is performed on the mobile station which uses, as the optimal beam, the beam of the serving base station 810 allocated at $T_0$ in the radio resource region for cooperative communications allocated by the first-step scheduling which has been performed at $T_0$, finally determining the mobile stations with which to perform cooperative communications based on the cooperation information allocated in the first-step scheduling and allocating data and radio resources to be transmitted and received upon cooperative communications by the determined mobile stations.

$T_{L+1}$: Cooperative Communication Interval

At $T_{L+1}$, the serving base station 810, in step 814, may transmit downlink data using the beam and radio resource region for cooperative communications allocated in the first-step scheduling 811 to the mobile station, e.g., mobile station 800, determined in the second-step scheduling 813. Further, in step 815, the mobile station determined in the second-step scheduling 813, e.g., the mobile station 800, may send uplink data to the serving base station 810. At this time, the serving base station 810 receives and detects uplink data using the optimal beam and radio resource region allocated in the first-step scheduling 811.

As set forth above, the serving base station 810 as per the embodiment of FIG. 8, previously allocates, at $T_0$, its beam and radio resource region to be used for cooperative communications with a neighbor base station, e.g., the neighbor base station 1 820, via the first-step scheduling and performs cooperative communications with the neighbor base station 1 820 at $T_{L+1}$ using the same. At this time, according to an embodiment of the present disclosure, the serving base station 810 allocates the mobile station with which to perform cooperative communications and data for transmission and reception with the mobile station via the second-step scheduling at $T_L$, which is immediately before the cooperative communication interval, $T_{L+1}$, thereby minimizing the performance deterioration due to the movement of mobile station. Further, although the operations of the serving base station 810 in steps 811 to 815 have been described separately per time interval for ease of description in the embodiment of FIG. 8, the operations of the serving base station 810 in steps 811 to 815 all may be performed during each time interval. In a specific example, the serving base station 810 may conduct downlink and uplink cooperative communications at $T_{L+1}$ in steps 814 and 815 while performing the first-step scheduling for cooperative communications at $T_{2L+2}$ in step 816, and the serving base station 810 may deliver the cooperation information obtained via the first-step scheduling to the neighbor base station 1 820 in step 817. The serving base station 810 at $T_{L+1}$ may conduct the second-step scheduling for cooperative communications at $T_{L+2}$ in step 818. Likewise, also at $T_0$ and $T_L$, the serving base station 810 may conduct cooperative communications in the corresponding intervals while performing the second-step scheduling for cooperative communications at the later time intervals or it may perform the first-step scheduling for cooperative communications at the later time interval and deliver cooperation information via the same to the neighbor base station.

Next, the neighbor base station 1 820 may operate as follows to perform cooperative communications with the serving base station 810 at $T_{L+1}$. For the operation of the neighbor base station 1 820, $T_L$ is defined as an interval during which it receives cooperation information and performs cooperative scheduling, and $T_{L+1}$ is defined as a cooperative communication interval as is the serving base station 810.

$T_L$: Cooperative Scheduling Interval

At $T_L$, the neighbor base station 1 820 performs cooperative scheduling in step 821 based on the cooperation information that the serving base station 810 has sent in step 812. As per the cooperative scheduling, the neighbor base station 1 820 determines the mobile station to perform cooperative communications with the serving base station 810, allocates beams to be used upon cooperative communications with the mobile station, and allocates radio resources for data to be transmitted and received upon cooperative communications.

$T_{L+1}$: Cooperative Communication Interval

At $T_{L+1}$, the neighbor base station 1 820 sends downlink data using the radio resources and beams allocated in the cooperative scheduling to the mobile station, e.g., mobile station2 830, determined via the cooperative scheduling in step 822, as an example of downlink communication. As an example of uplink communication, mobile station2 830 determined via the cooperative scheduling delivers uplink data to the neighbor base station 1 820 in step 823. Then, the neighbor base station 1 820 detects, via the radio resources, the uplink data received through the beams allocated in the cooperative scheduling. Although the operations of the neighbor base station 1 820 in steps 821 to 823 have been described separately per different time interval for ease of description, the operations of the neighbor base station 1 820 in steps 821 to 823 all may indeed be performed during each time interval. For example, the neighbor base station 1 820 may conduct cooperative scheduling for cooperative communications at $T_{L+2}$ in step 824 while performing cooperative communications in steps 822 and 823 at $T_{L+1}$.

Figure 9B:
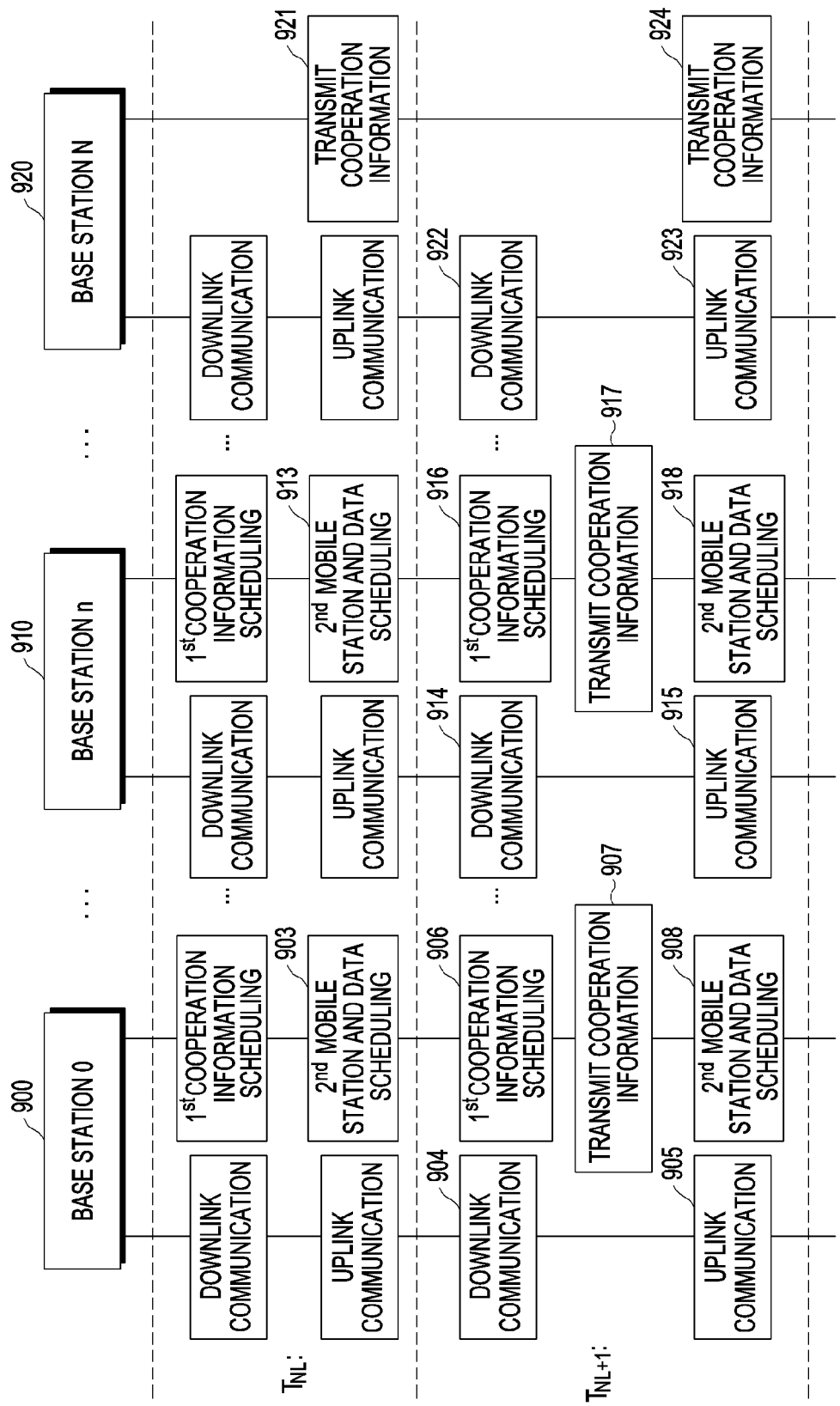

FIGS. 9a and 9b are views illustrating examples of the operations of performing distributed cooperative communications by N+1 neighbor base stations in an environment where a time delay exists on a network according to another embodiment of the present disclosure. Here, N>0.

In the embodiment of FIGS. 9a and 9b, such a scenario is assumed where, if a time delay $T_L$ occurs over the network upon transfer of cooperation information about one base station to neighbor base stations, N+1 neighbor base stations, in total, e.g., a base station 0 900, a base station n 910, and a base station 920, perform cooperative communications. Here, the N+1 neighbor base stations may be constituted only of a combination of MBSs and SBSs, or MBSs alone, or SBSs only.

For ease of description, the time interval during which cooperative communication is conducted is assumed to be $T_{NL+1}$. In this case, the base station 0 900 to perform cooperative communications at $T_{NL+1}$ operates as follows.

$T_0$: Cooperation Information Scheduling Interval

Referring to FIGS. 9a and 9b, at $T_0$, the base station 0 900 conducts the first-step scheduling in step 901 to allocate the radio resource region for cooperative communications with the neighbor base stations, i.e., the neighbor base stations 1 to N 920, on the downlink and uplink and beams to be used in the corresponding radio resource region. In step 902, the base station 0 900 delivers, via the network to each of the neighbor base station 1 to the base station N 920, the cooperation information containing the radio resource region allocated in the first-step scheduling and information about the beam mapped thereto.

$T_{NL}$: Mobile Station and Data Scheduling Interval

The base station 0 900 at $T_{NL}$ conducts the second-step scheduling for cooperative communications at $T_{NL+1}$ in step 903, allocating the mobile station with which to perform cooperative communications and data. Specifically, in the second-step scheduling, the second-step scheduling is performed on the mobile station which uses, as the optimal beam, the beam of the base station 0 900 allocated at $T_0$ in the radio resource region for cooperative communications allocated by the first-step scheduling 901, finally determining the mobile stations with which to perform cooperative communications based on the cooperation information allocated in the first-step scheduling and allocating data and radio resources to be transmitted and received upon cooperative communications by the determined mobile stations.

$T_{NL+1}$: Cooperative Communication Interval

At $T_{NL+1}$, the base station 0 900, in step 904, transmits downlink data using the beam and radio resource region allocated in the first-step scheduling 901 to the mobile station determined in the second-step scheduling 903. Further, in step 905, the mobile station determined in the second-step scheduling 903 send uplink data to the base station 0 900, and the base station 0 900 receives and detects the uplink data using the beam and radio resource region allocated in the first-step scheduling 901.

As set forth above, the base station 0 900 as per the embodiment of FIGS. 9a and 9b, previously allocates, at $T_0$, its beam and radio resource region to be used for cooperative communications with the base station 1 through the base station N 920, via the first-step scheduling and performs cooperative communications with the base station 1 and base station N 920 at $T_{NL+1}$ using the same. In this case, a time gap $T_{NL+1}-T_0$ between the first-step beam scheduling 901 and cooperative communication exists in the base station 0 900. However, according to an embodiment of the present disclosure, the base station 0 900 performs the second-step scheduling at $T_{NL}$ which is immediately before the cooperative communication at $T_{NL+1}$, thereby allocating the mobile station with which to perform cooperative communications and data for transmission and reception with the mobile station, thereby minimizing the performance deterioration due to the movement of mobile station. Like in FIG. 8, although the operations of the base station 0 00 in steps 901 to 905 have been described separately per different time interval for ease of description, the operations of the base station 0 00 in steps 901 to 905 all may be performed during each time interval. For example, the base station 0 900, at $T_{NL+1}$, may perform downlink and uplink cooperative communications in steps 904 and 905 while performing the second-step scheduling 908 for cooperative communications at $T_{2NL+2}$, perform the first-step scheduling 906 for cooperative communications at time interval $T_{NL+2}$, and deliver the cooperation information obtained via the first-step scheduling to the base station 1 to base station N 920 in step 907.

Next, the base station n (910, 0<n<N) to perform cooperative communications with N neighbor base stations at $T_{NL+1}$ may operate as follows.

$T_{nL}$ (0<n<N): Cooperation Information Scheduling Interval

At $T_{nL}$, the base station n 910 is in the state of having received, over the network, the cooperation information allocated as the base station 0 900, . . . , base station n−1 corresponding to neighbor base station set 1 conduct the first-step scheduling. In this case, in step 911, the base station n 910 performs the first-step scheduling based on the cooperation information of the base stations, allocating the analog signal area and beams for cooperative communications. In step 912, the base station n 910 delivers the cooperation information obtained through the first-step scheduling to the base stations, i.e., base station n+1, base station n+2, . . . , base station N 920, corresponding to neighbor base station set 2.

$T_{NL}$: Mobile Station and Data Scheduling Interval

At $T_{NL}$, the base station n 910, in step 913, performs the second-step scheduling, allocating the mobile station with which to perform cooperative communications and data. Specifically, in the second-step scheduling, the second-step scheduling is performed on the mobile station which uses, as the optimal beam, the beam of the base station n 910 allocated at $T_{nL}$, in the radio resource region for cooperative communications allocated by the first-step scheduling 911 which has been performed at $T_{nL}$, finally determining the mobile stations with which to perform cooperative communications based on the cooperation information allocated in the first-step scheduling and allocating data and radio resources to be transmitted and received upon cooperative communications by the determined mobile stations.

$T_{NL+1}$: Cooperative Communication Interval

At $T_{NL+1}$, the base station n 910, in step 914, may transmit downlink data using the beam and radio resource region, for cooperative communications, allocated in the first-step scheduling 911 to the mobile station allocated in the second-step scheduling 913. Further, in step 915, the mobile station determined in the second-step scheduling 913 may send uplink data to the base station n 910. At this time, the base station n 910 receives and detects the uplink data using the beam and radio resource region allocated in the first-step scheduling 911.

As set forth supra, the base station n 910 according to the embodiment of FIG. 9 previously allocates its beam and radio resource region for use in cooperative communication via the first-step scheduling at $T_{nL}$ based on the cooperation information received from the neighbor base station set 1 and performs cooperative communications with the neighbor base station set 2 at $T_{NL+1}$, using the same. Here, a time gap $T_{NL+1}-T_{NL}$ between the first-step beam scheduling and actual cooperative communication exists in the base station n 910. However, according to an embodiment of the present disclosure, the base station n 910 allocates the mobile station with which to perform cooperative communications and data for transmission and reception with the mobile station as the second-step scheduling is performed at $T_{nL}$, which is immediately before the cooperative communication interval, $T_{NL+1}$, thereby minimizing the performance deterioration due to the movement of mobile station. Although the operations of the base station n 910 in steps 911 to 915 have been described separately per different time interval for ease of description, the operations of the base station n 910 in steps 911 to 915 all may indeed be performed during each time interval. As a specific example, the base station n 910, at $T_{NL+1}$, may perform downlink and uplink cooperative communications in steps 914 and 915 while performing the second-step scheduling for cooperative communications at $T_{NL+2}$ in step 918, perform the first-step scheduling for cooperative communications at $T_{(2N-n)L+2}$, in step 916, and deliver the cooperation information obtained via the first-step scheduling to the base station n+1, base station n+2, . . . base station N 920, which are included in the neighbor base station set 2, in step 917.

Lastly, the base station N 920 to perform cooperative communications at $T_{NL+1}$ may operate as follows.

$T_{NL}$: Cooperative Scheduling Interval

At $T_{NL}$, the base station N 920 is in the state of having received the cooperation information obtained via the first-step scheduling of the corresponding base station from each of the base station 0 900 to the base station N−1. In step 921, the base station N 920 performs cooperative scheduling based on the cooperation information received from the base station 0 900 to base station N−1. As per the cooperative scheduling, the base station N 920 determines the mobile station to perform cooperative communications with the base station 0 900 to base station N−1, allocates the optimal beam for use upon cooperative communications with the mobile station, and allocates radio resources for data to be transmitted and received upon cooperative communications.

$T_{NL+1}$: Cooperative Communications

At $T_{NL+1}$, the base station N 920 sends downlink data using the radio resources and beams allocated in the cooperative scheduling to the mobile station determined via the cooperative scheduling in step 922. In step 923, the mobile station determined in the cooperative scheduling delivers uplink data to the base station N 920. Then, the base station N 920 detects the uplink data received via the radio resources and beams allocated in the cooperative scheduling. Although the operations of the base station N 920 in steps 921 to 924 have been described separately per different time interval for ease of description, the operations of the base station N 920 in steps 921 to 924 all may indeed be performed during each time interval. For example, the base station N 920 may conduct cooperative scheduling for cooperative communications at $T_{NL+2}$ in step 924 while performing cooperative communications in steps 922 and 923 at $T_{NL+1}$.

According to an embodiment of the present disclosure, the distributed cooperative communication technology as per embodiments of the present disclosure described above in connection with FIGS. 7 to 9 may also apply to layer cell environments. As a specific example, in a layer cell environment as per an embodiment of the present disclosure, an SBS may be connected with an MBS via wireless backhaul communications, and a time delay may occur in the signal transmission/reception over the wireless backhaul. Hence, the distributed cooperative communication technology as per an embodiment of the present disclosure is operated given the time delay in the wireless backhaul that may arise in the layer cell environment. Accordingly, the distributed cooperation scheme considering wireless backhaul in the layer cell environment, according to an embodiment of the present disclosure, is nearly similar to the schemes described above in connection with FIGS. 7 to 9, but differs as follows.

Specifically, in the layer cell environment according to an embodiment of the present disclosure, it is assumed that the FIN and MBS are installed in the same site as shown in FIG. 1, connected wiredly, and cooperation information for cooperative communications between the MBS and HN are delivered with no time delay.

According to an embodiment of the present disclosure, the SBS receives cooperation information for cooperating with the MBS and wireless backhaul not via wired network but via wireless backhaul. Therefore, when the wireless backhaul performs communications for delivering cooperation information to the SBS, the devices in the layer cell, all, provide cooperative communications. Here, the cooperation information delivered to the SBS contains information obtained via the first-step scheduling of MBS. According to an embodiment of the present disclosure, since the MBS performs the first-step scheduling as per the cooperation information via the first-step scheduling of the HN, where the HN performs the first-step scheduling, the cooperation information of the MBS cannot be known.

Accordingly, according to an embodiment of the present disclosure, the HN also performs scheduling for data transmission in two steps. First in the first-step scheduling, the HN allocates a resource region and beams for wireless backhaul communications and delivers the HN's cooperation information containing the beams and radio resource allocated. The MBS then performs first-step scheduling based on the HN's cooperation information and delivers the MBS's cooperation information to the HN.

According to an embodiment of the present disclosure, the HN thereafter includes its cooperation information and MBS's cooperation information in data and transmits the data to the SBS. Accordingly, the SBS may perform cooperative scheduling based on the HN's cooperation information and MBS's cooperation information. Here, since the wireless backhaul does not move but is stationary, no alteration occurs to the RBN for the radio resource of the wireless backhaul allocated in the HN's first-step scheduling. Therefore, although the MBS performs the two-step scheduling as set forth above to minimize the performance deterioration due to the movement of mobile station in the beamforming communication environment, the HN conducts the two-step scheduling to add the MBS's cooperation information upon data transmission and transmit the information. Further, according to an embodiment of the present disclosure, if the HN performs the two-step scheduling, the data transmission delay that occurs on the wireless backhaul may be minimized.

Figure 10A:
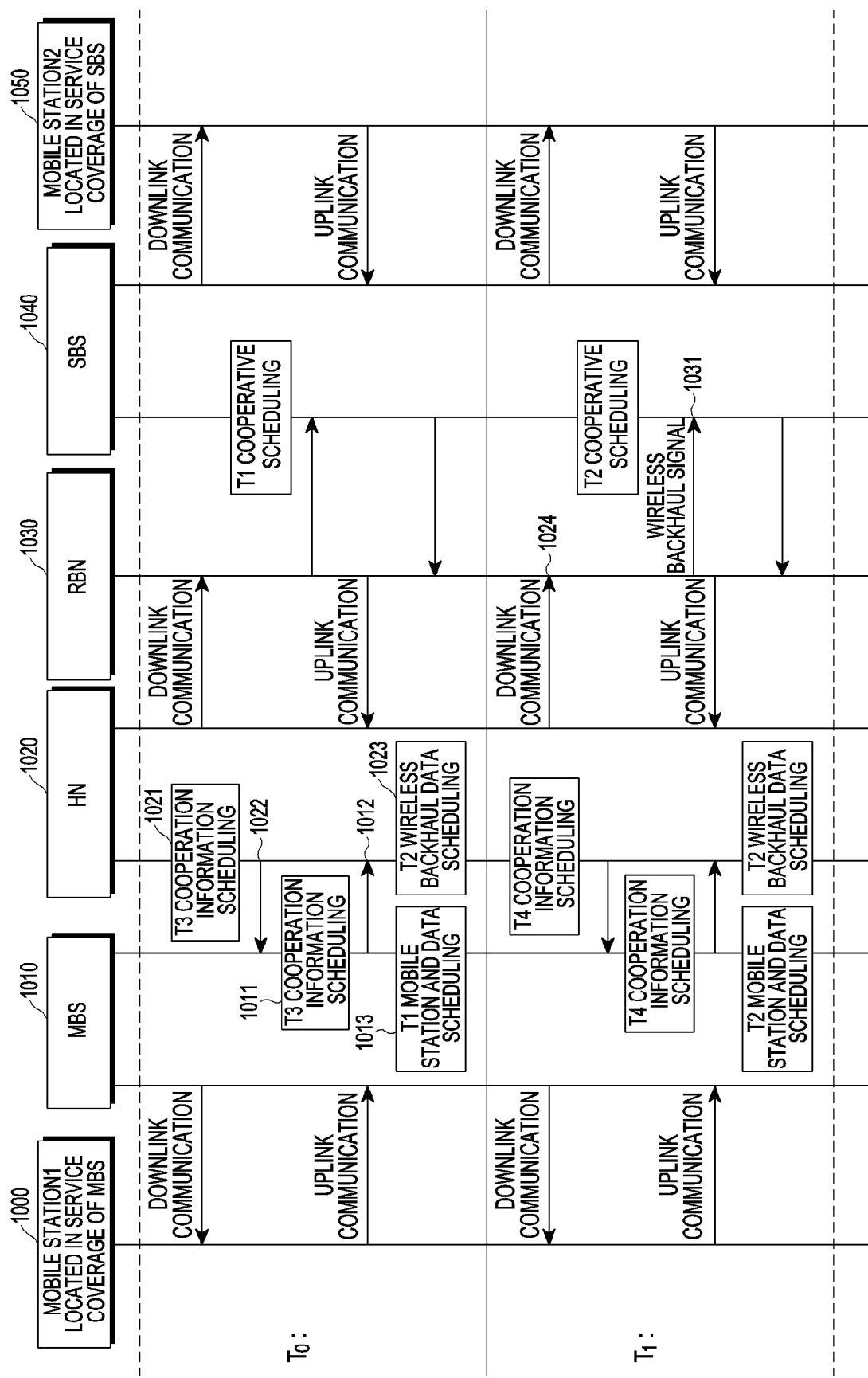
FIGS. 10a and 10b are flowcharts illustrating examples of operations of distributed cooperative communications in a layer cell environment according to an embodiment of the present disclosure.
Figure 10B:
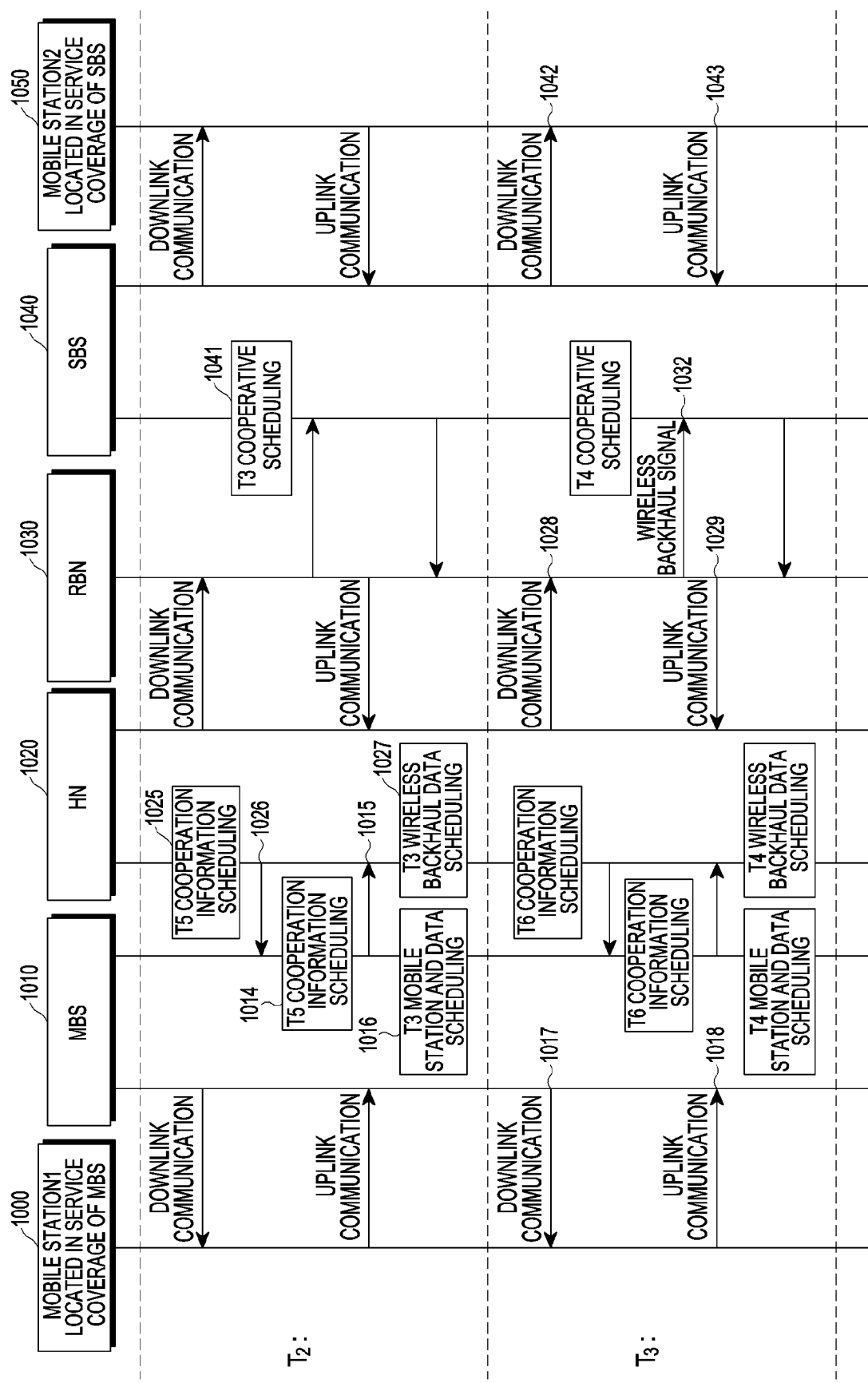

FIG. 10 is a flowchart illustrating examples of operations of distributed cooperative communications in a layer cell environment according to an embodiment of the present disclosure.

FIG. 10 illustrates an example in which distributed cooperative communications are performed among an MBS 1010, a mobile station 1 1000 located in the service coverage of the MBS 1010, a HN 1020, an RBN 1030, an SBS 1040, and a mobile station 2 1050 located in the service coverage of the SBS 1040. Although the communication devices shown in FIG. 10 conduct cooperative communications at each time interval according to an embodiment of the present disclosure, operations for conducting cooperative communications on downlink and uplink at time interval T3 are described for ease of description.

First, the HN 1020 to perform cooperative communications at T3 and the MBS 1010 according thereto are operated as follows.

T0: Cooperation Information Scheduling Interval

The HN 1020 at T0 performs first-step scheduling in step 1021, allocating a wireless backhaul resource region for transmitting and receiving wireless backhaul data and beams for use in the wireless backhaul resource region at T3. Here, the wireless backhaul resource region and beams allocated in the first-step scheduling of the HN are allocated for each of the downlink and uplink. In step 1022, the HN 1020 transfers the HN's cooperation information obtained via the first-step scheduling to the MBS 1010 installed in the same location as the HN 1020, without time delay. Here, the HN's cooperation information contains the wireless backhaul resource region and beams that are to be used in the wireless backhaul communication at T3.

Then, the MBS 1010 at T0 executes the first-step scheduling given the wireless backhaul beams and wireless backhaul resource region contained in the cooperation information based on the cooperation information of the HN 1020 in step 1011, and the MBS 1010 allocates the radio resource region for cooperative communication at T3 and beams for use in the radio resource region. In step 1012, the MBS 1010 transmits the cooperation information of the MBS 1010 obtained via the first-step scheduling to the HN 1020 without time delay. Here, the cooperation information of the MBS 1010 contains information about the radio resource region for cooperative communication at T3 and the beams to be used in the radio resource region. In step 1013, the MBS 1010 performs the second-step scheduling based on the cooperation information obtained via the first-step scheduling for cooperative communication at T1 which has been performed in the time interval before T0 and determines a mobile station, e.g., mobile station 1 1000, with which to perform cooperative communication at T1. In step 1023, the HN 1020 performs the second-step scheduling to choose an RBN to perform backhaul communication at T1 and allots wireless backhaul data for transmission and reception with the chosen RNB based on the cooperation information of the HN 1020 and the cooperation information of the MBS 1010. In the embodiment of FIG. 10, the wireless backhaul data which is to be transmitted during T1 contains radio resource allocation information for downlink and uplink wireless backhaul communication at T1 and control information including medium access layer control information, the cooperation information of the HN 1020 obtained in step 1021, the cooperation information of the MBS 1010 obtained in step 1012, and the wireless backhaul downlink data at T1. Here, the wireless backhaul downlink data contains data that the SBS is to send to the mobile station and various network layer control information for radio access communication between SBS and mobile station.

T1: Cooperation Information Delivery Interval

At T1, the HN 1020, in step 1024, sends, to the RBN 1030, the wireless backhaul data obtained via the second-step scheduling which has been performed in step 1023. Then, the RBN 1030 receives the wireless backhaul data and detects the corresponding data. In step 1031, the RBN 1030 obtains the cooperation information of the MBS 1010 for cooperative communication at T3 and cooperation information of the HN 1020 from the wireless backhaul data and delivers the information to the SBS 1040.

The MBS 1010 at T1 may use the cooperation information at T1 which has been executed in the previous time interval to perform cooperative communications with the mobile station 1 1000 on the downlink and uplink.

T2: Data Scheduling

The HN 1020 at T2 performs first-step scheduling in step 1025, allocating a wireless backhaul resource region for transmitting and receiving wireless backhaul data and beams for use in the wireless backhaul resource region at T5. Here, the wireless backhaul resource region and beams allocated in the first-step scheduling of the HN 1020 are allocated for each of the downlink and uplink. In step 1026, the HN 1020 transfers the HN's cooperation information obtained via the first-step scheduling to the MBS 1010 without time delay. Here, the HN's cooperation information is the same as the cooperation information of step 1022, and no repetitive description is thus given.

In step 1014, the MBS 1010 operates in the same manner as step 1011 based on the cooperation information of the HN 1020. Likewise in step 1012, the cooperation information 1010 of the MBS is in step 1015 transmitted to the HN 1020 without time delay. Here, the cooperation information of the MBS 1010 is the same as that of step 1012, and no repetitive description is thus given.

In step 1016, the MBS 1010 performs the second scheduling for cooperative communication at T3 based on the cooperation information of the MBS 1010 for cooperative communication at T3 obtained in step 1011. The mobile station to perform cooperative communication at T3 and data to transmit and receive with the mobile station are allocated via the second scheduling.

Then, in step 1027, the HN 1020, like in step 1023, conducts the second-step scheduling of the HN to choose an RBN and allocates wireless backhaul data to be transmitted and received with the chosen RNB. Here, the wireless backhaul data is transmitted and received based on the cooperation information of the HN 1020 obtained in step 1025. The wireless backhaul data to be transmitted during T3 is the same as the wireless backhaul data of step 1023 except for the difference that its transmission interval is T3.

Based on the cooperation information of the MBS 1010 and the cooperation information of the HN 1020 obtained via step 1031, the SBS 1040 at T2 performs cooperative scheduling that allocates the mobile station, beams, radio resources, and data for T3 cooperative communications in step 1041.

T3: Cooperative Communication

At T3, the HN 1020, in step 1028, sends the wireless backhaul data to the RBN 1030 chosen in step 1027 via the second-step scheduling. The RBN 1030 then detects the received wireless backhaul data. At this time, the HN 1020 sends the wireless backhaul data using the cooperation information obtained in the first-step scheduling of step 1021, i.e., the wireless backhaul resource region and beams mapped to the wireless backhaul resource region. At T3, the RBN 1030 delivers the wireless backhaul data to the SBS 1040 in step 1032. In step 1029, the HN 1020 receives a wireless backhaul signal from the RBN 1030 chosen in the second-step scheduling of step 1027 and detects data from the signal. At this time, the HN 1020 receives the wireless backhaul signal using the uplink wireless backhaul resource region and beams allocated in the first-step scheduling of step 1021.

The MBS 1010 at T3, in step 1017, sends data to the mobile station determined in step 1016, e.g., the mobile station1 1000, using the radio resource region and beams obtained in step 1011, and the mobile station1 1000 also detects data received based thereupon. Further, in step 1018, the mobile station1 1000 determined in step 1016 sends uplink data to the MBS 1010, and the MBS 1010 receives and detects the data of the mobile station1 1000 using the radio resource region and beams obtained in step 1011.

At T3, the SBS 1040, in step 1042, sends downlink data to a mobile station, e.g., mobile station2 1050, selected via the cooperative scheduling in step 1041. Further, in step 1043, the mobile station2 1050 selected via the cooperative scheduling transmits uplink data to the SBS 1040.

According to an embodiment of the present disclosure, base stations previously allocate radio resources to perform cooperative communications given a network delay and transmit and receive data under a delay. However, where the network delay is excessively large or the mobile station moves too quickly, a problem may arise due to the cooperative communication method according to an embodiment of the present disclosure. Hence, according to another embodiment of the present disclosure, dedicated radio resources, which are not used, may additionally be allotted upon cooperative communications with neighbor base stations. Further, for neighbor base stations that send interference values smaller than a predetermined value, no cooperative communication is required, and thus, non-cooperative radio resources may be additionally allocated therefor. For example, such a scenario is assumed where the mobile station's moving speed is able to be measured via the global positioning system (GPS) receiver embedded in the mobile station or other techniques. In this case, if the mobile station's moving speed measured exceeds a predetermined reference speed, e.g., 120 km/h, the mobile station may be determined to be a high-speed moving mobile station and dedicated radio resources, according to an embodiment of the present disclosure, may be allocated to the mobile station. According to another embodiment, unless the mobile station is equipped with the technique for estimating the moving speed, e.g., GPS, the mobile station's moving speed may be estimated using the number of times of varying the optimal beam of the base station for the mobile station per unit time. For example, where the beam of the base station for the mobile station is varied a predetermined time (once) or more per second, the mobile station may be determined to be a high-speed moving mobile station, and dedicated radio resources may be allocated to the mobile station. According to another embodiment, dedicated radio resources may be allocated even where the data transmission delay should be minimized as per user traffic. For example, where the type of traffic is one of voice and video call traffic, virtual reality traffic, and traffic for driving automobile, it may be determined as traffic to minimize transmission delay for retransmission packets and initial transmission and the dedicated radio resources may be allocated.

According to an embodiment of the present disclosure, where non-cooperation radio resources and dedicated radio resources are allocated, it remains alike in that two-step scheduling is conducted for distributed cooperative communications but differs in light of the following. In the first-step scheduling, only a radio resource region corresponding to non-cooperation radio resources or dedicated radio resources is allocated without beam allocation. In the second-step scheduling, a mobile station, beams, and data to use the radio resource region allocated are allocated.

Accordingly, according to another embodiment of the present disclosure, resources to be allocated to a corresponding mobile station are separately allocated depending on the type of traffic and the moving speed of the mobile station, allowing for distributed cooperative communications. In this case, the resources to be allocated to the mobile station are radio resources for cooperative communications, dedicated radio resources, or non-cooperation radio resources.

Figure 11:
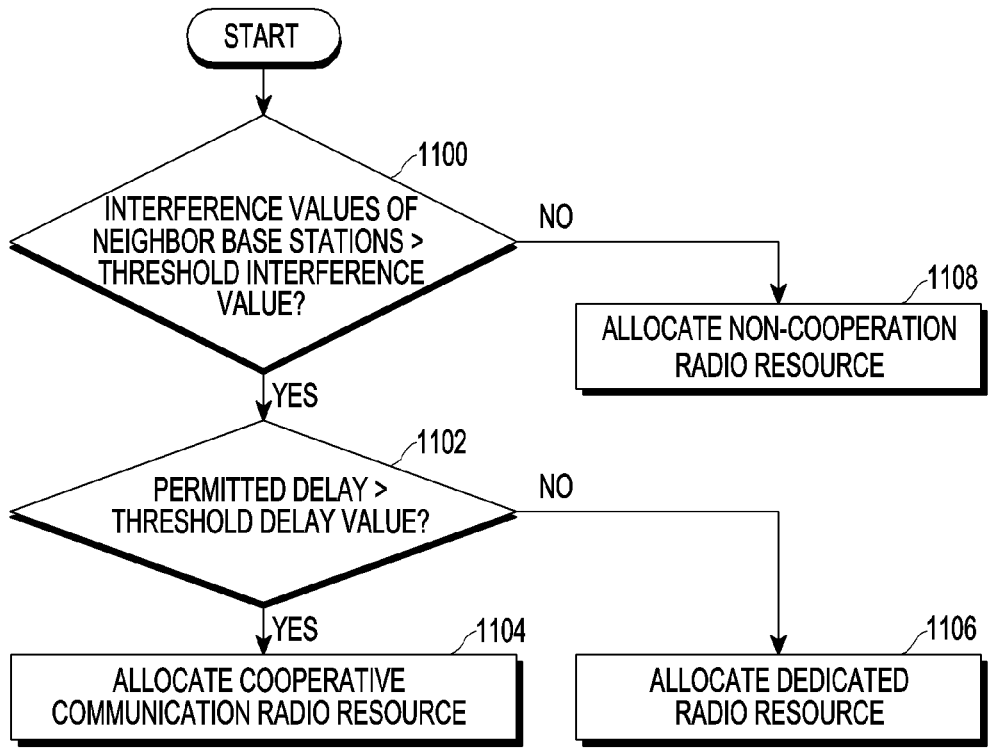
FIG. 11 is a flowchart illustrating an example of the operation of allocating resources for distributed cooperative communications according to another embodiment of the present disclosure.

FIG. 11 is a flowchart illustrating an example of the operation of allocating resources for distributed cooperative communications according to another embodiment of the present disclosure.

Referring to FIG. 11, in step 1100, the scheduler measures the respective interference values of neighbor base stations and compare the measured interference values with a predetermined threshold interference value. As a result of the comparison, it goes to step 1108 for the neighbor base stations having the interference values smaller than the threshold value. In step 1108, the scheduler determines that cooperative communications need not perform for the neighbor base stations having the interference values smaller than the threshold value and allocate predetermined dedicated radio resources for non-cooperative communications.

Where there are neighbor base stations corresponding to interference values equal or larger than the threshold interference value as a result of the comparison, the scheduler proceeds with step 1102. In step 1102, the scheduler identifies a permitted transmission delay for the neighbor base stations having interference values larger than the threshold interference value. Where it is identified that the transmission delay permitted for the neighbor base stations is larger than a predetermined threshold delay value, the scheduler allocates radio resources for cooperative communications to the neighbor base stations in step 1104. Where it is identified that the transmission delay permitted for the neighbor base stations is equal or smaller than the predetermined threshold value, the scheduler determines that it is difficult to apply the two-step scheduling considering the transmission delay, according to an embodiment of the present disclosure, to the corresponding neighbor base stations and allocates dedicated-radio resources in step 1106, enabling communications without delay. In step 1102, the operation of identifying the delay value permitted for the neighbor base stations may be carried out further considering the type of traffic that the corresponding mobile station transmits and receives, and the moving speed, according to an embodiment of the present disclosure. Specific operations as to the traffic type and moving speed are the same as those described above, and no repetitive description is given below.

Figure 12:
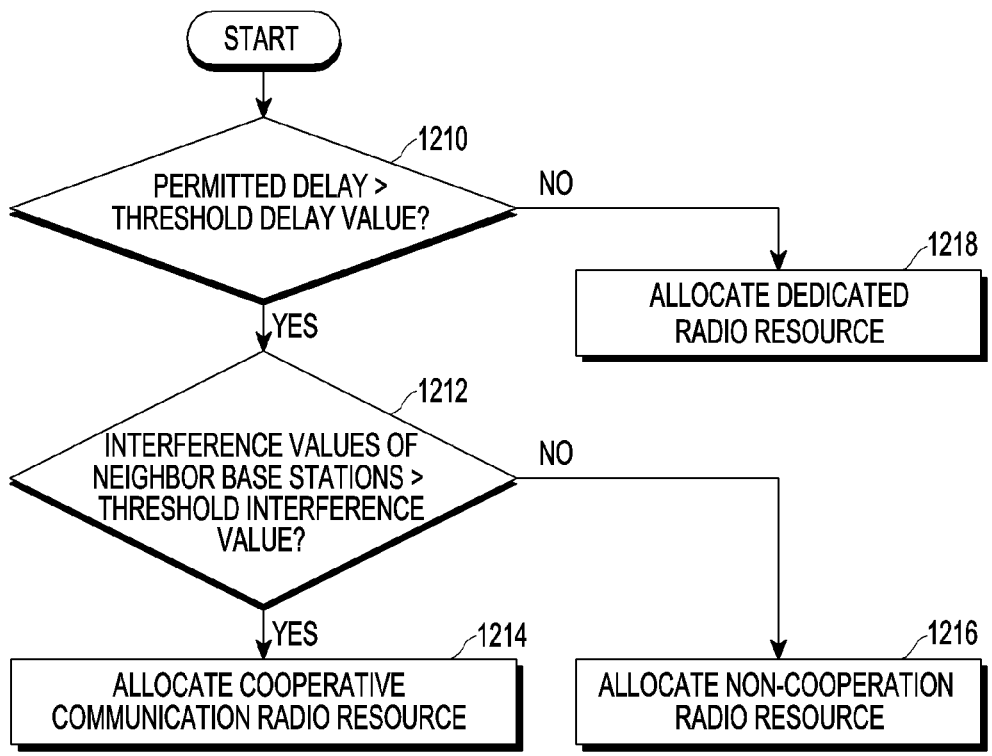
FIG. 12 is a flowchart illustrating another example of the operation of allocating resources for distributed cooperative communications according to another embodiment of the present disclosure.

The embodiment of FIG. 12 corresponds to the case where the conditions for determining whether to apply cooperative communications are identified in the order reverse to that shown in FIG. 11. The operation in each step is the same as those described above in connection with FIG. 11, and no duplicate description is presented.

Figure 13:
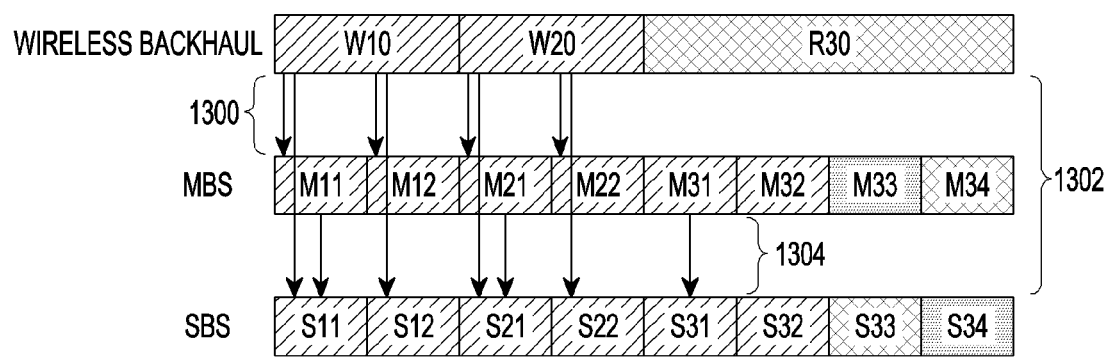
FIG. 13 is a view illustrating an example of allocating resources for performing distributed cooperative communications among a radio backhaul, an MBS, and an SBS according to an embodiment of the present disclosure.

FIG. 13 is a view illustrating an example of allocating resources for performing distributed cooperative communications among a radio backhaul, an MBS, and an SBS according to an embodiment of the present disclosure.

Referring to FIG. 13, for example, according to an embodiment of the present disclosure, the HN of wireless backhaul performs the first-step scheduling to backhaul communication radio resources for cooperative communications with neighbor base stations, i.e., wireless backhaul beams for transmitting and receiving wireless backhaul data, which is to be transmitted to the SBS, to/from the RBN, and W10 and W20 corresponding to the wireless backhaul resource regions for transmission and reception of the wireless backhaul data. The HN allocates the remaining resource region R30 which is not used for wireless backhaul communications, as dedicated radio resources. In step 1300, the HN delivers, to the MBS, the HN's cooperation information containing the allocated wireless backhaul communication radio resources.

According to an embodiment of the present disclosure, the MBS receives the wireless backhaul beams and wireless backhaul resource allocation information from the HN's cooperation information received via step 1302 and performs the first-step scheduling. At this time, the MBS selects the MBS beams where the interference with the wireless backhaul is smaller than a predetermined threshold interference value upon signal transmission and reception via the wireless backhaul beams in the wireless backhaul radio resources W10 and W20. Where the maximum interference by the SBS and mobile station is larger than the threshold interference value, the MBS determines that cooperative communications with the SBS are necessary and allocates beams for cooperative communications with the SBS, and M11 and M21 corresponding to the cooperative radio resource regions. Where the maximum interference by the SBS and mobile station is smaller than the threshold interference value as a result of the comparison, M12 and M22 corresponding to the non-cooperation radio resources to be used may be allocated. Further, the MBS allocates the cooperation radio resource M31 and beams, the non-cooperation radio resource M32, the MBS-dedicated radio resource M33, and the SBS-dedicated radio resource M34 within the dedicated radio resource R30 which is not used by the wireless backhaul. The radio resources of the MBS allocated in the R30, i.e., M31 to M34, need not take wireless backhaul interference into consideration, enabling communications using beams that greatly interfere with the wireless backhaul or receives significant interference by the wireless backhaul. The MBS-dedicated radio resource M33 may be allocated for the mobile station and traffic that cannot permit a time delay for cooperative communications. The MBS delivers the radio resource allocation information as described above, as cooperation information, to the HN.

Then, in step 1302, the FIN transfers the wireless backhaul radio resource information allocated as described above and the cooperation information received from the MBS to the RBNs of all the SBSs. The wireless backhaul radio resource information and cooperation information contain the wireless backhaul radio resources W10 and W20, beam allocation information about each radio resource, allocation information about the dedicated radio resource R30, the cooperation radio resources M11, M21, and M31 of the MBS, beam allocation information about each radio resource, non-cooperation radio resource M12, M22, and M32 allocation information, MBS-dedicated radio resource M33 allocation information, and SBS-dedicated radio resource M34 allocation information.

Thereafter, if the SBS receives the wireless backhaul radio resource allocation and the cooperation information of the MBS via steps 1302 and 1304, it allocates cooperation radio resources S11 and S21 for cooperative communications and their corresponding beams considering the wireless backhaul beams and MBS beams and performs cooperative communications considering the wireless backhaul beams and performs cooperative scheduling that allocates non-cooperation radio resources S12 and S22, which do not cooperate with the MBS, and their corresponding beams, allocates the cooperation radio resource S31 that provides cooperative communications and its corresponding beam considering the MBS beams, allocates the non-cooperation radio resource S32, which does not cooperate with the MBS, and its corresponding beam, and allocates the dedicated radio resource S34 of the SBS and its corresponding beam.

Lastly, the MBS performs the second-step scheduling to finally choose the mobile station to conduct cooperative communications on the cooperation radio resources M11, M21, and M31, schedules data, schedules the corresponding mobile station, beams, and data on the non-cooperation radio resources M12, M22, and M32, and schedules the corresponding mobile station, beams, and data on the dedicated radio resource M33 of the MBS.

Referring to FIGS. 14a to 14d and 15a to 15e, operations for performing distributed cooperative communications in a layer cell environment, according to an embodiment of the present disclosure, are described below more specifically. Here, the base stations in the layer cell environment are assumed to always use the optimal beam given the location of a corresponding mobile station and the results of measurement upon communications with the mobile station. In the following description, $I_{DL}$ and $I_{UL}$, respectively, denote the downlink interference power value and the uplink interference power value.

Figure 14A:
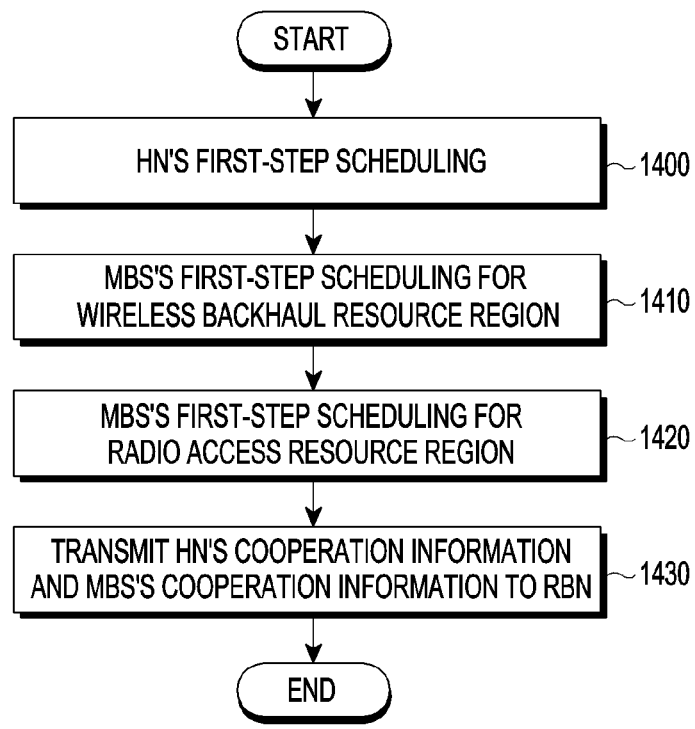
FIG. 14a is a view illustrating an example of a first-step scheduling operation for distributed cooperative communications in a layer cell environment according to an embodiment of the present disclosure.

FIG. 14a is a view illustrating an example of a first-step scheduling operation for distributed cooperative communications in a layer cell environment according to an embodiment of the present disclosure.

Figure 14B:
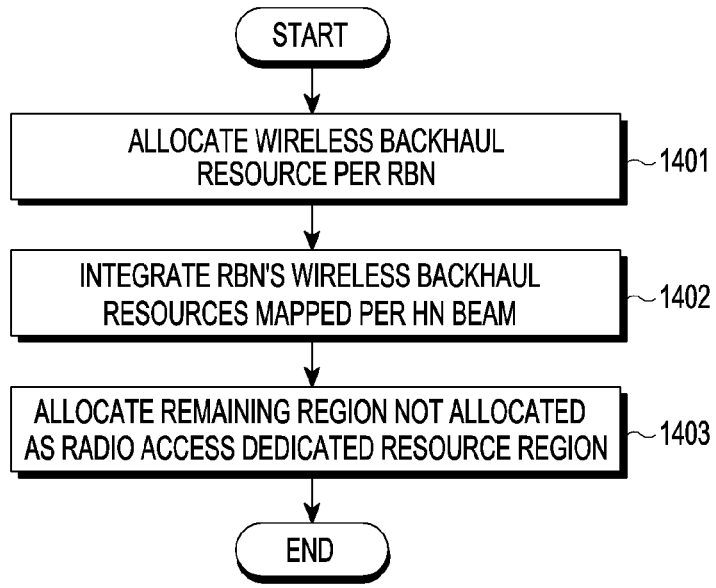
FIG. 14b is a flowchart illustrating an example of first-step scheduling operation of an HN.

Referring to FIG. 14a, in step 1400, the HN of wireless backhaul performs the first-step scheduling per RBN communicating with the HN. FIG. 14b is a flowchart illustrating an example of first-step scheduling operation of an HN. Referring to FIG. 14b, in step 1401, the FIN allocates wireless backhaul resources to each RBN. Here, the wireless backhaul resources include radio resources for wireless backhaul communications on the downlink and uplink. In step 1402, the HN integrates, per HN beam, the wireless backhaul resources for each RBN to designate a radio resource region. The wireless backhaul resources allocated with the same beams among the HN beams are integrated into one to designate a wireless backhaul resource region while the wireless backhaul resources allocated with different beams among the beams are not integrated to designate a wireless backhaul resource region. The wireless backhaul resource region designated by the HN may be represented as, e.g., $W_{10*i}$, i=1, 2, 3, . . . , (I−1). In step 1403, the HN designates the remaining radio resources which are not allocated in the wireless backhaul resource region as a radio access resource region for mobile communications. The radio access resource region may be represented as, e.g., $R_{10*I}$. As shown in FIG. 14b, the HN allocates the wireless backhaul resource region and beams for use in the wireless backhaul resource region via the first-step scheduling. The HN transfers the HN's cooperation information containing information about the wireless backhaul resource region and the beams to the MBS.

Figure 14C:
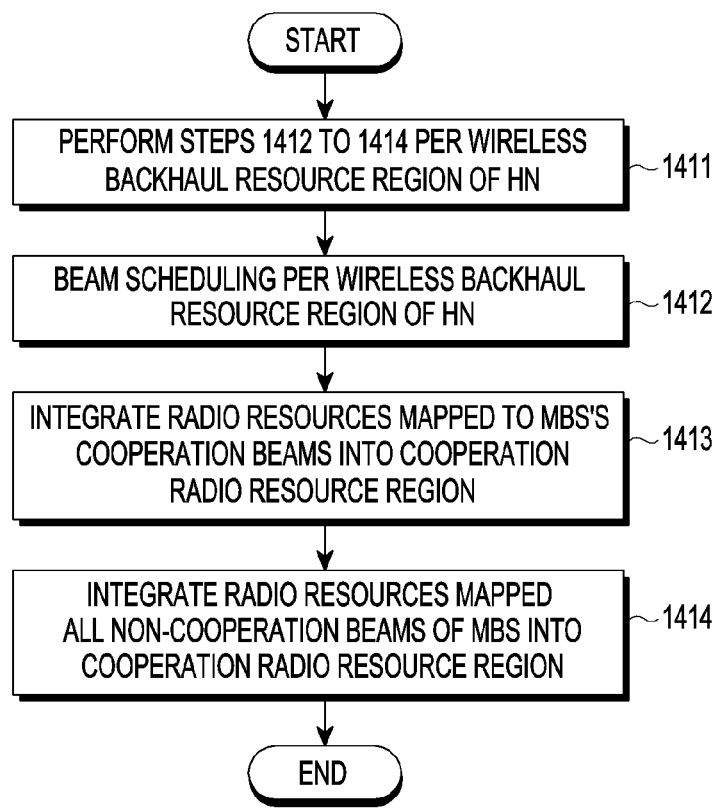
FIG. 14c is a flowchart illustrating an example of the operation of performing first-step scheduling for radio back-haul communications by an MBS according to an embodiment of the present disclosure.

In step 1410 of FIG. 14a, the MBS performs the first-step scheduling for radio access communications that cooperate with the wireless backhaul in the wireless backhaul resource region $W_{10*i}$, i=1, 2, 3, . . . , (I1) based on the wireless backhaul resource region obtained from the HN's cooperation information. Here, the MBS, because of being implemented in the same location or device as the HN, may real-time receive the HN's cooperation information without time delay. The mobile stations scheduled in the first-step scheduling for radio access communications which cooperate with the wireless backhaul are candidate mobile stations for allocating resources in the wireless backhaul resource region $W_{10*i}$, i=1, 2, 3, . . . , (I1). FIG. 14c is a flowchart illustrating an example of the operation of performing first-step scheduling for radio backhaul communications by an MBS according to an embodiment of the present disclosure. Referring to FIG. 14c, in step 1411, the MBS performs steps 1412 to 1414 per wireless backhaul resource region obtained from the cooperation information of the HN. In step 1412, the MBS, $BS^0$ may represent a beam group $B^s_{\perp-DL}\{B^0_k|I_{RA\to BH}\} ; B^s_{\perp-UL}\{B^0_k|I_{BH\leftarrow RA}\}$ constituted of the beams of the BS in which the interference values received by the HN and RBN upon communications using the beam $B_k^0$ of the HN using the interference values obtained as shown in FIG. 6 for the beam $B_k^0$ of HN, $BS^0$ are smaller than each of the reference values $I_{RA\to BH}$ and $I_{BH\leftarrow RA}$ as shown in Equations 10 and 11 below:

$$B^s_{\perp-DL}\{B^0_k|I_{RA\to BH}\} = \{B^s_b|I_{DL}(B^s_b \to B^0_k) < I_{RA\to BH}\} \quad \text{[Equation 10]}$$

$$B^s_{\perp-UL}\{B^0_k|I_{BH\leftarrow RA}\} = \{B^s_b|I_{UL}(B^0_k \leftarrow B^s_b) < I_{BH\leftarrow RA}\} \quad \text{[Equation 11]}$$

It may represent a group of the mobile stations the optimal beams of $BS^S$ for which belong to each beam group $B^s_{\perp-DL}\{B^0_k|I_{RA\to BH}\} ; B^s_{\perp-UL}\{B^0_k|I_{BH\leftarrow RA}\}$ on the downlink and uplink for wireless backhaul communications as shown in Equations 12 and 13 below.

$$M^s_{\perp-DL}\{B^0_k|I_{RA\to BH}\} = \{MS^s_m|B^s_{best}(MS^s_m) \in B^s_{\perp-DL}\{B^0_k|I_{RA\to BH}\}\} \quad \text{[Equation 12]}$$

$$M^s_{\perp-UL}\{B^0_k|I_{BH\to RA}\} = \{MS^s_m|B^s_{best}(MS^s_m) \in B^s_{\perp-UL}\{B^0_k|I_{BH\to RA}\}\} \quad \text{[Equation 13]}$$

$BS^s$ performs scheduling on the mobile station group to allocate candidate mobile stations and radio resources and determine $BS^s$ beams corresponding thereto. Here, the beams of $BS^s$, in which the interference values received by the RBN communicating the HN beams among the $BS^s$ beams are larger than the reference values $I_{RA\to BH}$ and $I_{BH\leftarrow RA}$, are excluded from the first-step scheduling for radio access communications that cooperate with the wireless backhaul of the MBS in step 1410. According to the embodiment of FIG. 14c, the HN may provide its desired reference values $I_{RA\to BH}$ and $I_{BH\leftarrow RA}$ to the MBS. At this time, e.g., a proportional fair (PF) scheduling algorithm may be put to use. Further, interference values by the wireless backhaul may be reflected to the scheduling algorithm. For example, where the beam $B_k^0$ of the HN is used in a particular wireless backhaul resource region, the PF scheduler for downlink communications of the MBS may choose the mobile station $MS_m^s$ that maximizes the Utility Function $U_m(t)$ value at the scheduling time t as shown in Equation 14 below in the particular wireless backhaul resource region.

$$m^* = \arg\max_m U_m(t)$$ [Equation 14]

where, $U_m(t) = r_m(t)/T_m(t)$.

$$r_m(t) = W\log_2\left(1 + \frac{\beta\gamma_m^s(t)}{\sigma^2 + I_{DL}(B_k^0 \to m)}\right)$$ [Equation 15]

W means the signal bandwidth, but not the wireless backhaul resource region $W_{10*i}$ described above. $\beta$ means any constant that meets $0<\beta\leq 1$, $\gamma_m^s(t)$ means the power value of the $BS^S$ signal received by the mobile station m, i.e., $MS_m^s$, on downlink, $\sigma^2$ denotes the noise power, and $I_{DL}$ ($B_k^0 \to m$) denotes the power value of downlink interference with the mobile station m, i.e., $MS_m^s$, by the beam $B_k^0$ of the HN. In Equation 15 above, rather than the per-mobile station interference values, per-base station interference values $I_{DL}$ ($B_k^0 \to B_{best}^s(m)$) may be used as shown in Equation 16.

$$r_m(t) = W\log_2\left(1 + \frac{\beta\gamma_m^s(t)}{\delta^2 + I_{DL}(B_k^0 \to B_{best}^s(m))}\right)$$ [Equation 16]

The PF scheduler of the MBS for uplink communications in the wireless backhaul resource region uses Equations 15 and 16 above. Here, $\beta$, $\gamma_m^s(t)$, and $\sigma^2$ used on uplink may differ from those used on downlink. In particular, $\gamma_m^s(t)$ denotes the power value of signal received on uplink by $BS^S$ from $MS_m^s$ which may be represented as shown in Equation 17 below.

$$r_m(t) = W\log_2\left(1 + \frac{\beta\gamma_m^s(t)}{\delta^2 + I_{UL}(B_{best}^s(m) \leftarrow B_k^0)}\right)$$ [Equation 17]

where $I_{UL}(B_{best}^s(m) \leftarrow B_k^0)$ best denotes the power value of the uplink wireless backhaul signal, i.e., interference, received by $BS^S$ via the beam $B_{best}^s(m)$. At this time, it is the case where the optimal beam of the HN receiving the uplink wireless backhaul signal is $B_k^0$.

Thereafter, the PF scheduler for the MBS for downlink and uplink communications, upon completing the afore-described scheduling operation, updates the $T_m(t)$ value for all mobile stations as shown in Equation 18 below for scheduling operations at next times.

$$T_m(t+1) = \begin{cases} \alpha T_m(t) + (1-\alpha)\gamma_m(t), & \text{if } m \text{ is scheduled at time } t \\ \alpha T_m(t), & \text{if } m \text{ is not scheduled at time } t \end{cases}$$ [Equation 18]

where $\alpha$ is any constant that meets $0<\alpha<1$. Since the beams of the wireless backhaul may differ in different wireless backhaul resource regions, the interference values used in Equations 15 to 17 are also varied.

Further, the MBS divides the radio resource beams allocated by step 1412 in each wireless backhaul resource region $W_{10*i}$, i=1, 2, 3, . . . , (I1) obtained from the HN's cooperation information into cooperation beams and non-cooperation beams as per Equations 8 and 9 above. In step 1413, the MBS integrates radio resources for which the same cooperation beams have been chosen into a single cooperation radio resource region. It may make an additional selection as to whether, for the cooperation radio resource region, the SBS is to perform joint transmission cooperative communications or cooperative communications for interference avoidance. In step 1414, the MBS integrates the radio resources for which non-cooperation beams have been chosen into a single non-cooperation radio resource region. The cooperation and non-cooperation radio resources of the MBS obtained by performing the first-step scheduling on each wireless backhaul resource region of the MBS may be represented as, e.g., $M_{10*i+j}$, i=1, 2, 3, . . . , (I-1), j=1, 2, . . . , J(i). Here, J(i) means that its value may vary depending on i. Additionally, it may be assumed, for ease of description, that the first J(i)–1 MBS radio resources $M_{10*i+j}$, j=1, 2, . . . , J(i)–1 among the MBS radio resources for each wireless backhaul resource region $W_{10*i}$ have been designated as cooperation radio resources and the last MBS radio resource $M_{10*i+J(i)}$ has been designated as a non-cooperation radio resource.

Figure 14D:
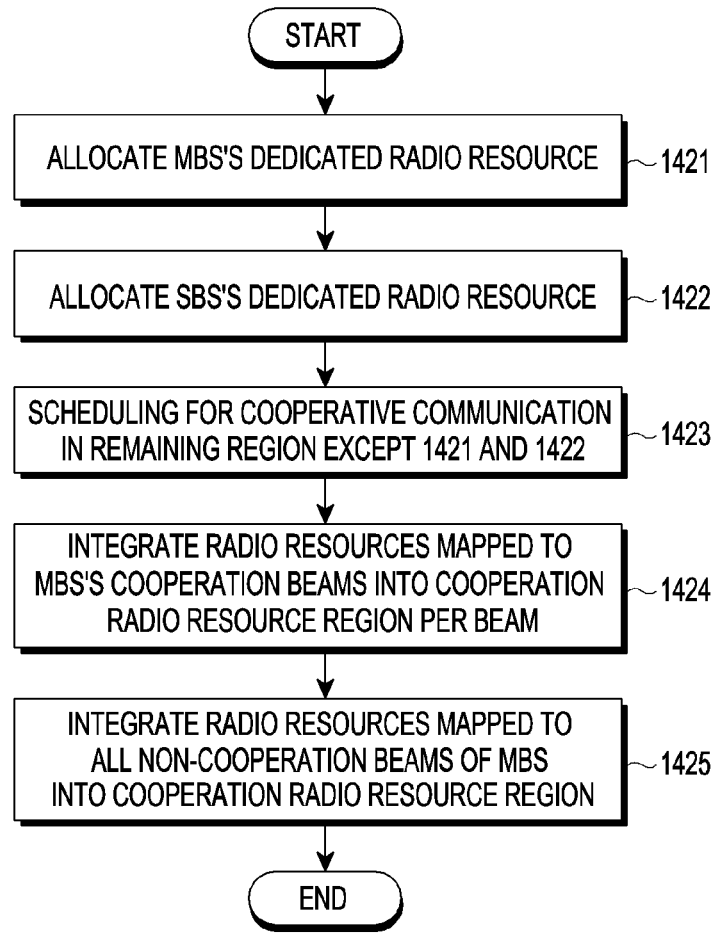
FIG. 14d is a flowchart illustrating an example of an operation for first-step scheduling for radio access by an MBS according to an embodiment of the present disclosure.

In step 1420 of FIG. 14*a*, the MBS performs the first-step scheduling for the radio access resource region $R_{10*I}$. By the first-step scheduling for the radio access resource region, the MBS, $BS^S$ conducts the first-step scheduling on the radio access resource region obtained from the HN's cooperation information. The mobile stations considered in the scheduling of step 1420 are candidate mobile stations for resource allocations in the radio access resource region. Like the HN's cooperation information, the MBS's cooperation information obtained by performing scheduling on the MBS's radio access is delivered to the HN without delay. FIG. 14*d* is a flowchart illustrating an example of an operation for scheduling of a first step for radio access by an MBS according to an embodiment of the present disclosure. Referring to FIG. 14*d*, in step 1421, the MBS allocates the MBS's dedicated radio resources for the high-speed moving mobile station or low-latency traffic. And in step 1422, the MBS allocates the SBS's dedicated radio resources upon the network's instruction of operation and maintenance (OAM) or a request from the SBS. In step 1423, the MBS schedules all the mobile stations located in the service coverage of the MBS without considering the HN's beams and interferences in the remaining resource regions except the MBS's dedicated radio resources and the SBS's dedicated radio resources among the radio access resource regions obtained from the HN's cooperation information. At this time, e.g., a PF scheduling algorithm may be put to use. That is, Equations 17, 18, and 19 may be used.

$$r_m(t) = W\log_2\left(1 + \frac{\beta\gamma_m^s(t)}{\sigma^2}\right)$$ [Equation 19]

Further, the MBS's beams mapped to the radio resources allocated are divided into cooperation beams and non-cooperation beams as per Equations 8 and 9. In step 1424, the MBS integrates radio resources for which the same cooperation beams have been chosen into a single cooperation radio resource region. It may make an additional selection as to whether, for the cooperation radio resource region, the SBS is to perform joint transmission cooperative communications or cooperative communications for interference avoidance. In step 1425, the MBS integrates the radio resources for which non-cooperation beams have been chosen into a single non-cooperation radio resource region. The cooperation and non-cooperation radio resources of the MBS obtained by performing the first-step scheduling on the radio access resource region $R_{10*I}$ of the MBS may be represented as, e.g., $M_{10*I+j}$, j=1, 2, . . . , J(I). It may be assumed, for ease of description, that the first J(I)−3 MBS radio resources $M_{10*I+k}$, j=1, 2, . . . , J(I)−3 among the MBS radio resources for the radio access resource region $R_{10*I}$ have been designated as cooperation radio resources and the next MBS radio resources $M_{10*i+J(I)2}$, $M_{10*i+(J)1}$ and $M_{10+i+J(I)}$ have been designated as a non-cooperation radio resource, an MBS dedicated radio resource, and an SBS dedicated radio resource, respectively.

Lastly, in step 1430 of FIG. 14*a*, the HN transmits, to the RBN, wireless backhaul data containing the information allocated to the SBS and the allocation information of the first-step scheduling performed on the radio access resource region and the wireless backhaul resource region of the MBS and the cooperation information of the HN. Here, the beams and wireless backhaul resource region for transmitting the wireless backhaul data to the RBN are allocated by the first-step scheduling performed by the HN in the past.

Figure 15A:
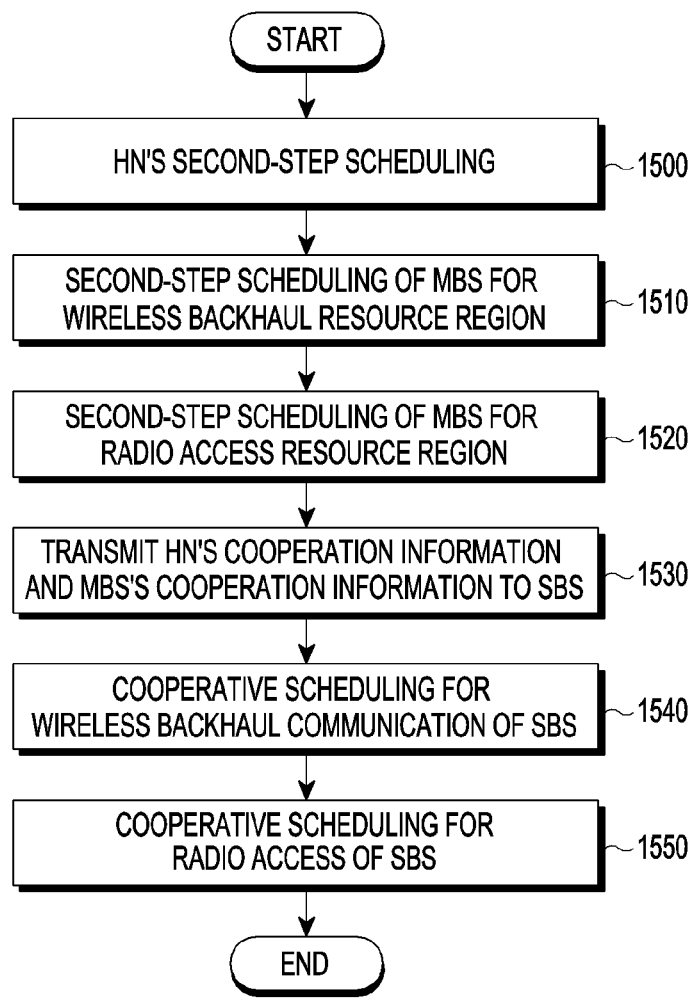
FIG. 15a is a view illustrating an example of a second-step scheduling operation for distributed cooperative communications in a layer cell environment according to an embodiment of the present disclosure.

FIG. 15*a* is a view illustrating an example of a scheduling operation of a second step for distributed cooperative communications in a layer cell environment according to an embodiment of the present disclosure. Although an example is described in which the second-step scheduling is performed in order on each of the HN, MBS, and SBS for ease of description, indeed, the second-step scheduling is independently performed on each device described in FIGS. 15*b* to 15*e*.

Referring to FIG. 15*a*, in step 1500, the HN performs scheduling on the RBNs using the FIN beams allocated to the wireless backhaul resource region $W_{10*i}$, i=1, 2, 3, . . . , (I-1), which has been obtained by performing, in the past, the first-step scheduling described in connection with step 1400 of FIG. 14*a* and FIG. 14*b*, in the wireless backhaul resource region, allocating detailed radio resources and data for the RBNs.

Figure 15B:
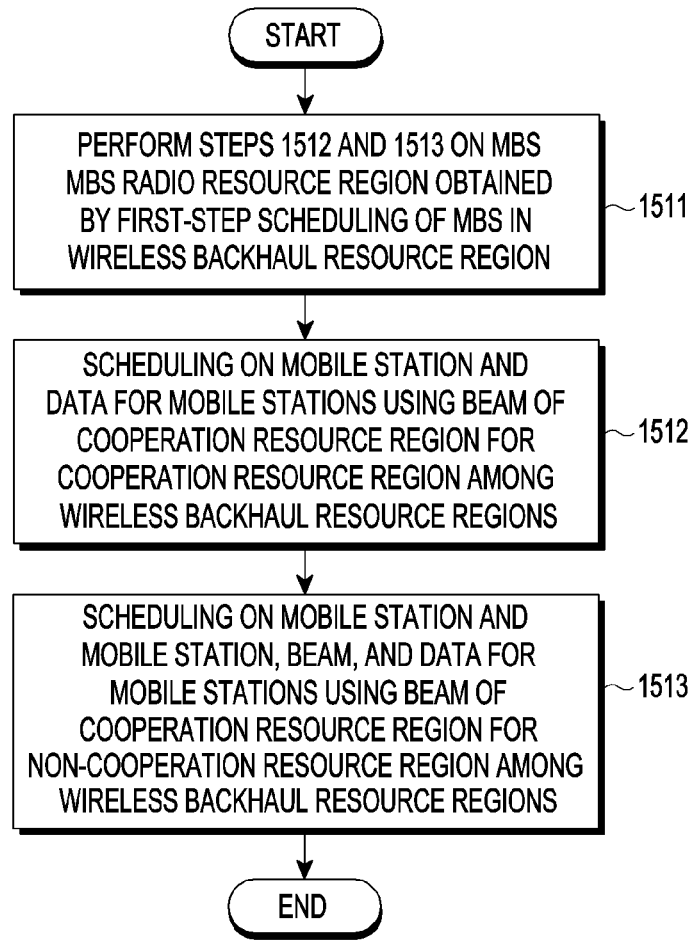
FIG. 15b is a flowchart illustrating an example of the operation of performing second-step scheduling for radio access communications which are cooperative of a radio backhaul in a radio backhaul resource region by an MBS.

And in step 1510, the MBS conducts the second-step scheduling for radio access communications that cooperate with the wireless backhaul in the wireless backhaul resource region $W_{10*i}$, i=1, 2, 3, . . . , (I−1). FIG. 15*b* is a flowchart illustrating an example of the operation of performing scheduling a second step for radio access communications which are cooperative of a radio backhaul in a radio backhaul resource region by an MBS. Referring to FIG. 15*b*, in step 1511, MBS, $BS^S$ performs steps 1512 and 1513 on each wireless backhaul resource region $W_{10*i}$, i=1, 2, 3, . . . , (I−1) obtained via the first-step scheduling of FIG. 14*c* and step 1410 of FIG. 14*a*. In step 1512, $BS^S$ performs scheduling targeting all mobile station groups $M^s_{best}\{B_b^s\}$ located in the service coverage of the MBS which uses, as the optimal beam, the beam $B_b^s$ of the corresponding cooperation radio resource region for each radio resource region, e.g., $M_{10*i+j}$, j=1, 2, . . . , J(i)−1, among the wireless backhaul radio resource regions $W_{10*i}$, allocating the mobile station to perform radio access communications cooperating with the wireless backhaul, radio resources, and data. In this case, upon performing the first-step scheduling on the wireless backhaul resource region of the MBS, a variation may occur in the mobile station using the beams of the cooperation radio resource region at the current moment of the second-step scheduling due to the movement of the mobile station, as compared with when allocating the cooperation radio resource region, and the amount of data to be scheduled may be varied although the mobile station remains the same. In this case, as set forth above, e.g., the PF scheduling algorithms of Equations 15 to 19 may be used.

In step 1513, for each non-cooperation radio resource region, e.g., $M_{10*i+J(i)}$, among the wireless backhaul radio resource regions $W_{10*i}$, $BS^S$ schedules all the MBS mobile stations using, as the optimal beam, the non-cooperation beam of the group, i.e., $B^s_{\perp-DL}\{B^0_k|I_{RA \to B}\}$, $B^s_{\perp-UL}\{B^0_k|I_{BH \leftarrow RA}\}$, of the MBS beams, where the interference values received by the beam $B_k^0$ of the corresponding non-cooperation radio resource region are smaller than the reference values $I_{RA \to BH}$ and $I_{BH \leftarrow RA}$, allocating the corresponding mobile station, beams, radio resources, and data. In this case, upon performing the first-step scheduling of the MBS for the wireless backhaul resource region, a change may be made to the location of the mobile station allocated to use the non-cooperation radio resource region at the current moment of the second-step scheduling due to the movement of the mobile station, as compared with when allocating the non-cooperation radio resource region, and the amount of data to be scheduled may be varied although the mobile station remains the same. Like the scheduling of the cooperation radio resource region, the PF scheduling algorithms of Equations 15 to 19 may be used.

Figure 15C:
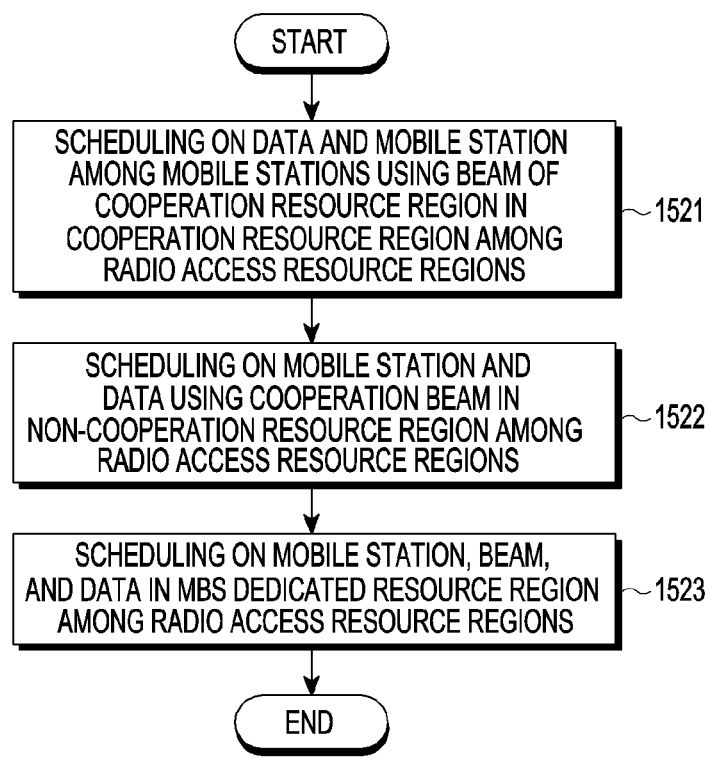
FIG. 15c is a flowchart illustrating an example of the operation of second-step scheduling by an MBS for a radio access resource region according to an embodiment of the present disclosure.

In step 1520 of FIG. 15*a*, BSS performs the second-step mobile station and data scheduling on the cooperation radio resource region $R_{10*I}$ of the radio access resource region obtained from the first-step scheduling carried out via step 1420 of FIG. 14*a* to FIG. 14*d*. Additionally, the second-step scheduling may be carried out on the non-cooperation and dedicated radio resource regions. FIG. 15*c* is a flowchart illustrating an example of the operation of scheduling of a second step by an MBS for a radio access resource region $R_{10*I}$ according to an embodiment of the present disclosure. Referring to FIG. 15*c*, in step 1521, for each cooperation radio resource region, e.g., $M_{10*I+j}$, j=1, 2, . . . , J(I)−3 of the radio access resource region $R_{10*I}$, $BS^S$ performs scheduling targeting the mobile station groups $M^s_{best}\{B_b^s\}$ located in the service coverage of all the MBSs which use, as the optimal beam, the beam $B_b^s$ of the cooperation radio resource region, allocating the mobile station, radio resources, and data. As compared with when performing the first-step scheduling for radio access of the MBS to allocate the cooperation radio resource region, a change may be made to the location of the mobile station using the beams of the resource region at the current moment of the second-step scheduling due to the movement of the mobile station, and the amount of data to be scheduled may be varied although the mobile station remains the same. For example, the PF scheduling algorithms of Equations 15, 19, and 20 may be used.

In step 1522, the MBS schedules all the mobile stations located in the service coverage of the MBS using the non-cooperation beam as the optimal beam in the non-cooperation radio resource region, e.g., $M_{10*I+J(I)-2}$ of the radio access resource region $R_{10*I}$, allocating the mobile station to perform radio access communications, beams, radio resources, and data. In this case, as compared with when performing the first-step scheduling of the MBS for the radio access resource region $R_{10*I}$, a change may be made to the location of the mobile station allocated to use the resource region at the current moment of the second-step scheduling due to the movement of the mobile station, as compared with when allocating the non-cooperation radio resource region, and the amount of data to be scheduled may be varied although the mobile station remains the same. At this time, e.g., the PF scheduling algorithms of Equations 14, 18, and 19 may be used.

In step 1523, the MBS performs scheduling for the mobile station transmitting and receiving low-latency traffic or high-speed moving mobile station using the cooperation beam among all the mobile stations located in the service coverage of the MBS for the MBS's dedicated radio resource region, e.g., $M_{10*I+J(I)-1}$, of the radio access resource region $R_{10*I}$, allocating the mobile station, beams, radio resources, and data. At this time, e.g., the PF scheduling algorithms of Equations 14, 18, and 19 may be used.

Figure 15D:
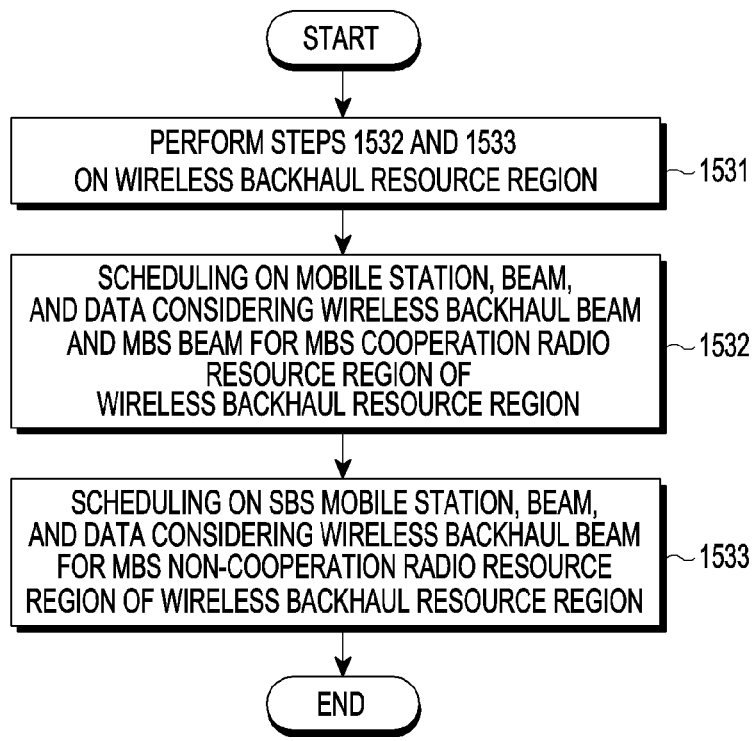
FIG. 15d is a flowchart illustrating an example of the operation of cooperative scheduling by an SBS according to an embodiment of the present disclosure.

In step 1530 of FIG. 15*a*, the SBS receives the scheduling allocation cooperation information of the first step for the radio access resource region and the wireless backhaul of the MBS and the cooperation information for the wireless backhaul resource region by the HN's first-step scheduling via the wireless backhaul, and based thereupon, conducts cooperative scheduling for radio access communications that cooperate with the wireless backhaul in the wireless backhaul resource region $W_{10*i}$, i=1, 2, 3, . . . , (I-1) in step 1540. FIG. 15*d* is a flowchart illustrating an example of the operation of cooperative scheduling by an SBS according to an embodiment of the present disclosure.

Referring to FIG. 15*d*, in step 1531, the SBS conducts steps 1532 and 1533 on each wireless backhaul radio resource region $W_{10*i}$, i=1, 2, 3, (I-1) and beams obtained in step 1530. Here, the HN according to an embodiment of the present disclosure may previously provide its desired reference values $I_{RA \to BH}$ and $I_{BH \leftarrow RA}$ to the SBS. Also, the MBS may previously give the SBS its desired reference values $I_{SC \to MC}$ and $I_{MC \leftarrow SC}$. Here, SC and MC, respectively, stand for small cell and macro cell.

In step 1532, SBS, $BS^S$ performs scheduling given the beam $B_k^1$ of the MBS and the beam $B_k^0$ of the HN in each cooperation radio resource region $M_{10*i+j}$, j=1, 2, . . . , J(i)–1 of the wireless backhaul radio resource region $W_{10*i}$ for downlink communications, allocating the mobile station, beam $B_b^S$, radio resources, and data. At this time, where the SBS provides cooperative communications for interference avoidance for the cooperation radio resource region, the SBS may make a selection from among the beams belonging to the beam group, i.e., $B^s_{\perp-DL}\{B^0_k|I_{RA \to BH}\} \cap B^s_{\perp-DL}\{B^1_k|I_{SC \to MC}\}$, of the SBS in which the interference $I_{DL}(B^k_b \to B^0_k)$ received via the beam of the downlink wireless backhaul radio resource region is smaller than the reference value $I_{RA \to BH}$, and the interference $I_{DL}(B^s_b \to B^1_k)$ received from the downlink MBS beam is smaller than the reference value $I_{SC \to MC}$. Further, scheduling may be carried out given the interference of the HN beams and MBS beams with the mobile station of the SBS. In this case, Equations 14 to 18 described above, Equation 20 or 21 below may be used.

$$r_m(t) = W\log_2\left(1 + \frac{\beta\gamma^s_m(t)}{\sigma^2 + I_{DL}(B^0_k \to m) + I_{DL}(B^1_k \to m)}\right) \quad \text{[Equation 20]}$$

$$r_m(t) = W\log_2\left(1 + \frac{\beta\gamma^s_m(t)}{\sigma^2 + I_{DL}(B^0_k \to B^s_{best}(m)) + I_{DL}(B^1_k \to B^s_{best}(m))}\right) \quad \text{[Equation 21]}$$

Further, where the SBS provides joint transmission-based cooperative communications for the cooperation radio resource region for downlink communications, the SBS may choose the beam with the largest magnitude of the signal received among the mobile stations located in the service coverage of the MBS performing communications via the beams of the MBS and having small interference values received by the RBN and may perform cooperative communications based on the joint transmissions.

Meanwhile, SBS, $BS^S$ performs scheduling given the beam $B_k^1$ of the MBS and the beam $B_k^0$ of the HN in each cooperation radio resource region $M_{10*i+j}$, j=1, 2, . . . , J(i)–1 of the wireless backhaul radio resource region $W_{10*i}$ for uplink communications, allocating the mobile station, beam $B_b^s$, radio resources, and data. At this time, where the SBS provides cooperative communications for interference avoidance for the cooperation radio resource region, the SBS may make a selection from among the beams belonging to the beam group, i.e., $B^s_{\perp-UL}\{B^0_k|I_{BH \leftarrow RA}\} \cap B^s_{\perp-UL}\{B^1_k|I_{MC \leftarrow SC}\}$, of the SBS where the interference $I_{UL}(B^0_k \leftarrow B^s_b)$ received via the beam of the downlink wireless backhaul radio resource region is smaller than the reference value $I_{RA \to BH}$, and the interference $I_{UL}(B^1_k \leftarrow B^s_b)$ received from the downlink MBS beam is smaller than the reference value $I_{SC \to MC}$. Also given the interference values received by the beams of the SBS due to the communications of the HN's beams and the MBS's beams, scheduling may be carried out. For example, the PF scheduling algorithms of Equations 14, 18, and 22 may be used.

$$r_m(t) = W\log_2\left(1 + \frac{\beta\gamma^s_m(t)}{\sigma^2 + I_{UL}(B^s_{best}(m) \leftarrow B^0_k) + I_{UL}(B^s_{best}(m) \leftarrow B^1_k)}\right) \quad \text{[Equation 22]}$$

Lastly, in step 1533, the SBS, i.e., $BS^S$, performs scheduling in the non-cooperation radio resource region $M_{10*i+J(i)}$ of the wireless backhaul radio resource region $W_{10*i}$ for the downlink communications, allocating the mobile station, beam $B_b^s$, radio resources, and data. At this time, the beam of the SBS for communicating with the mobile stations is selected from among the beams belonging to the beam group, i.e., $B^s_{\perp-DL}\{B^0_k|I_{RA \to BH}\}$, where the interference $I_{DL}(B^s_b \to B^0_k)$ received by the RBN of the wireless backhaul radio resource region is smaller than the reference value $I_{RA \to BH}$. Further, scheduling is performed considering interference by the wireless backhaul beam with the mobile station. For example, the PF scheduling algorithms of Equations 15, 19, 16, or 17 may be used.

SBS, $BS^S$ performs scheduling in the non-cooperation radio resource region $M_{10*i+J(i)}$ of the wireless backhaul radio resource region $W_{10*i}$ for uplink communications, allocating the mobile station, the SBS's beam $B_b^s$, radio resources, and data. At this time, the beam of the SBS for communicating with the mobile stations is selected from among the beams belonging to the beam group, i.e., $B^s_{\perp-UL}\{B^0_k|I_{BH \leftarrow RA}\}$, where the interference $I_{UL}(B^0_k \leftarrow B^s_b)$ received by the RBN of the wireless backhaul radio resource region is smaller than the reference value $I_{RA \to BH}$. Further, scheduling is performed considering interference by the wireless backhaul beam with the small cell base station beam. For example, the PF scheduling algorithms of Equations 15, 19, and 18 may be used.

Figure 15E:
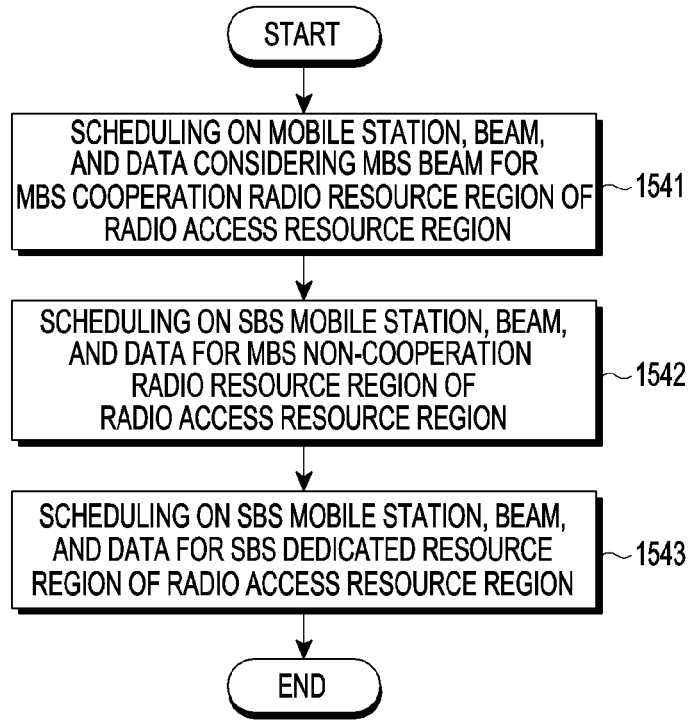
FIG. 15e is a flowchart illustrating an example of the operation of cooperative scheduling by an SBS according to an embodiment of the present disclosure.

Lastly, in step 1550 of FIG. 15*a*, the SBS performs cooperative scheduling for the radio access resource region $R_{10*I}$ based on the cooperation information for radio access communications and wireless backhaul of the MBS and the HN's cooperation information previously obtained. FIG. 15*e* is a flowchart illustrating an example of the operation of cooperative scheduling by an SBS according to an embodiment of the present disclosure.

Referring to FIG. 15*e*, in step 1541, the SBS, i.e., $BS^S$, performs scheduling given the beam $B_k^1$ of the MBS in each cooperation radio resource region, e.g., $M_{10*I+k}$, j=1, 2, . . . , J(I)–3 of the radio access resource region $R_{10*I}$ for downlink communications, allocating the mobile station, beam $B_b^s$, radio resources, and data. At this time, where the SBS provides interference avoidance cooperative communications for the cooperation radio resource region, the beam of the SBS for communicating with mobile stations is selected from among the beams belonging to the beam group, i.e., $B^s_{1\text{-}DL}\{B^1_k|I_{SC \to MC}\}$ where the interference $I_{DL}(B_b^s \to B_k^1)$ received by the beam $B_k^1$ of the MBS is smaller than the reference value $I_{SC \to MC}$. Further, scheduling may be performed considering interference by the MBS with the mobile station. For example, the PF scheduling algorithms of Equations 14, 18, 23, or 24 may be used.

$$r_m(t) = W \log_2\left(1 + \frac{\beta \gamma_m^s(t)}{\sigma^2 + I_{DL}(B_k^1 \to m)}\right) \quad \text{[Equation 23]}$$

$$r_m(t) = W \log_2\left(1 + \frac{\beta \gamma_m^s(t)}{\sigma^2 + I_{DL}(B_k^1 \to B_{best}^s(m))}\right) \quad \text{[Equation 24]}$$

Where the SBS provides joint transmission-based cooperative communications for the cooperation radio resource region, the SBS may select the SBS beam with the largest magnitude of signal, which the corresponding mobile station receives, among the mobile stations located in the service coverage of the MBS communicating via the beams of the MBS, thereby providing cooperative communications.

The SBS, i.e., $BS^S$, performs scheduling given the beam $B_k^1$ of the MBS in each cooperation radio resource region, e.g., $M_{10*I+j}$, j=1, 2, . . . , J(I)–3 of the radio access resource region $R_{10*I}$ for uplink communications, allocating the mobile station, beam $B_b^s$, radio resources, and data. At this time, the beam of the SBS for communicating with the mobile stations is selected from among the beams belonging to the beam group, i.e., $B^s_{1\text{-}UL}\{B^1_k|I_{MC \leftarrow SC}\}$, where the interference $I_{UL}(B^1_k \leftarrow B^s_b)$ received by the RBN of the wireless backhaul radio resource region is smaller than the reference value $I_{RA \to BH}$. Further, PF scheduling may be performed given the interference by the MBS beam with the mobile station in which case, e.g., Equations 14, 18, and 25 may be used.

$$r_m(t) = W \log_2\left(1 + \frac{\beta \gamma_m^s(t)}{\sigma^2 + I_{UL}(B_{bset}^s(m) \leftarrow B_k^1)}\right) \quad \text{[Equation 25]}$$

In step 1542, $BS^S$ conducts scheduling in the non-cooperation radio resource region, e.g., $M_{10*I+J(I)-2}$, of the radio access resource region $R_{10*I}$ for downlink and uplink communications, allocating the mobile station, beams, radio resources, and data. At this time, scheduling may be carried out by measuring the mean interference magnitude by the sidelobe of the MBS beam, or considering the interference value for the mobile station in the case where it is known by the antenna beam pattern model or the interference value has been obtained by other experiment or measurement. For example, where the interference value is denoted by $I_1$, Equations 14 and 18, and Equation 26 below, may be used.

$$r_m(t) = W \log_2\left(1 + \frac{\beta \gamma_m^s(t)}{\sigma^2 + I_1}\right) \quad \text{[Equation 26]}$$

Lastly, in step 1543, the SBS conducts scheduling in the SBS dedicated radio resource region, e.g., $M_{10*I+J(I)}$, of the radio access resource region $R_{10*I}$ for downlink and uplink communications, allocating the mobile station, beams, radio resources, and data. At this time, scheduling on the mobile stations may be carried out under the assumption that there is no interference with the MBS. For example, the PF scheduling algorithms of Equations 14, 18, and 19 may be used.

As set forth above, the present disclosure may optimize the performance of cooperative communications that are provided by a plurality of base stations transmitting and receiving signals via beam forming antennas while minimizing the amount of information that should be shared among the plurality of base stations for the cooperative communications. Specifically, according to an embodiment of the present disclosure, per-beam interference values of a base station are determined for distributed cooperative communications, and the per-beam interference values are shared with neighbor base stations, greatly reducing the amount of information shared for cooperative communications. Since per-beam interference values of a base station, according to an embodiment of the present disclosure, are fixed values that do not change over time, they need not deliver to the neighbor base stations in real-time or frequently, but they may rather be transferred as per predetermined periods or as necessary. Further, according to an embodiment of the present disclosure, interference values generated on uplink from neighbor base stations are not directly measured by a base station, and interference values measured on downlink are switched to uplink interference values which are then used for cooperative communications on uplink. This eliminates the waste of uplink radio resources for measuring uplink interference while raising uplink communication efficiency. Further, since interference measurement becomes more accurate or precise as the beam width of base station narrows for per-beam interference values of the base station, a better performance may be achieved in further communication environments where communications are carried out with a number of narrow beams. Further, the HN of the present disclosure provides interference reference values $I_{RA \to BH}$ and $I_{BH \leftarrow RA}$ to its MBS and SBS, enabling adjustment of the magnitude of interference received therefrom. Further, the MBS of the present disclosure gives neighbor base stations the interference reference values $I_{SC \to MC}$ and $I_{MC \leftarrow SC}$, able to adjust the magnitude of interference, by the neighbor cell, with the MBS.

According to an embodiment of the present disclosure, per-beam interference information of base station may be shared among all the base stations on the uplink and downlink, and communications on downlink and cooperative communications on uplink all may be supported.

According to an embodiment of the present disclosure, an SBS may deliver data to the wireless backhaul via distributed cooperative communications considering transmission delay.

According to an embodiment of the present disclosure, a serving base station or MBS, upon downlink and uplink communications, performs two-step scheduling to support cooperative communications with neighbor base stations. By the two-step scheduling, the serving base station or MBS may implement and operate scheduling for cooperative communications and beam switching independently from each other. Further, the two-step scheduling ensures a performance of cooperative communications even for mobile stations that are on the move. Further, since the beam switching of a base station is not influenced by cooperative scheduling, it may be simplified to implement and verify a beam switching device of the base station. Such nature may make a significant contribution to implementing a beamforming communication system and shortening test time and efforts. According to an embodiment of the present disclosure, the two-step scheduling may be applicable to parallel cooperative communications between an MBS or SBS and an MBS or SBSs, and also, to cooperative communications between MBS and SBS in a layer cell environment.

Further, according to an embodiment of the present disclosure, the wireless backhaul conducts two-step scheduling to provide cooperative communications with the MBS and SBS when performing downlink and uplink communications. In other words, the HN allocates wireless backhaul resources and beams for future use via the first-step scheduling and delivers the resources and beams, as cooperation information, to the MBS. Then, the MBS allocates radio resources and beams cooperating with the wireless backhaul based on the cooperation information of the HN and transfers the information, as cooperation information, to the HN. Then, the HN according to an embodiment of the present disclosure may conduct the two-step scheduling and convey the MBS's cooperation information, alongside the SBS's data, to the SBS, allowing the SBS to perform cooperative scheduling for radio access with the mobile station based on the cooperation information. Hence, according to an embodiment of the present disclosure, the wireless backhaul may minimize the influence by interference and maximize communication performance when the MBS and SBS communicate on the frequency that the mobile communication system uses.

According to an embodiment of the present disclosure, such a conclusion may be made that interference values of neighbor base stations received by the mobile station are small so that cooperative communications are not required. In this case, cells may communicate without cooperation via use of non-cooperation radio resources. Also what may be concluded is that it may be impossible to apply distributed cooperation depending on the type of traffic or due to the mobile station's quick movement although interference by neighbor base stations is large enough to require cooperative communications in which case dedicated radio resources are allocated and means is supported that communicates without cooperation.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for providing cooperative communication on a downlink and an uplink, the method comprising the steps of:
   determining, by a serving base station, a first interference value per beam of the serving base station based on a second interference values for neighbor base stations received from a plurality of mobile stations in a cell of the serving base station;
   transmitting the first interference value per beam to at least one neighbor base station;
   determining, by the serving base station, a radio resource and a beam for the cooperative communication in each transmission time interval based on the first interference value per beam;
   transmitting allocation information about the radio resource and the beam to the at least one neighbor base station for which the radio resource and the beam are determined;
   determining, by the serving base station, at least one mobile station for communicating with the serving base station with the radio resource and the beam during a first time interval prior to a second time interval during which the cooperative communication is performed; and
   performing the cooperative communication for the at least one mobile station with the at least one neighbor base station among the neighbor base stations.

2. The method of claim 1, wherein the step of determining, by the serving base station, the first interference value per beam includes the steps of:
   grouping, by the serving base station, the plurality of mobile stations using a same beam into one group per beam of the serving base station; and
   determining, by the serving base station, the first interference value of the same beam mapped to the one group based on the second interference values for beams of the neighbor base stations measured by the plurality of mobile stations included in the one group.

3. The method of claim 2, wherein the first interference value of the same beam mapped to the one group is determined as one of a maximum or minimum value of the second interference values measured by the plurality of mobile stations or a value obtained by applying linear/non-linear computation.

4. The method of claim 1, wherein the allocation information about the radio resource and the beam includes a reference value to classify a cooperation beam for use in the cooperative communication with the at least one neighbor base station.

5. The method of claim 4, wherein the step of determining, by the serving base station, the radio resource and the beam includes the steps of:
   classifying, by the serving base station, at least one beam exceeding the reference value among beams of the serving base station; and
   determining, by the serving base station, one of the at least one beam as the cooperation beam for use in the cooperative communication.

6. The method of claim 4, further comprising the step of excluding, by the serving base station, at least one beam less than the reference value among beams of the serving base station from the cooperation beam for the cooperative communication.

7. The method of claim 1, further comprising the step of allocating, by the serving base station, a radio resource except for the radio resource for the cooperative communication on a mobile station exceeding a predetermined moving speed and traffic to which a time delay does not apply.

8. The method of claim 1, wherein the first interference value per beam is transmitted to at least one of the neighbor base stations periodically.

9. The method of claim 1, wherein the first interference value per beam is transmitted to at least one of the neighbor base stations in response to a request from the at least one neighbor base station.

10. A base station for providing cooperative communication on a downlink and an uplink, the base station comprising:

a processor and a memory, wherein the memory is configured to store various data necessary for the processor to operate or computer readable instructions, and wherein the processor operates using contents stored in the memory and is configured to:

determine a first interference value per beam of the base station based on a second interference values for neighbor base stations received from a plurality of mobile stations in a cell of the base station;

transmit the first interference value per beam to at least one neighbor base station;

determine a radio resource and a beam for the cooperative communication in each transmission time interval based on the first interference value per beam;

transmit allocation information about the determined radio resource and the determined beam to the at least one neighbor base station for which the radio resource and the beam are determined;

determine at least one mobile station to communicate with the base station with the determined radio resource and the determined beam during a first time interval prior to a second time interval during which the cooperative communication is performed; and perform the cooperative communication for the at least one mobile station with the at least one neighbor base station among the neighbor base stations.

11. The base station of claim 10, wherein:

the processor performs computer readable instructions of the base station, the processor configured to determine the first interference value per beam of the base station is further configured to:

group the plurality of mobile stations using a same beam into one group per beam of the base station; and determine the first interference value of the same beam mapped to the one group based on the second interference values for beams of the neighbor base stations measured by the plurality of mobile stations included in the one group;

wherein the first interference value of the same beam mapped to the one group is determined as one of a maximum or minimum value of the second interference values measured by the plurality of mobile stations or a value obtained by applying linear/non-linear computation.

12. The base station of claim 10, wherein:

the allocation information about the radio resource and the beam includes a reference value to classify a cooperation beam for use in the cooperative communication with the at least one neighbor base station.

13. The base station of claim 10, wherein the processor is configured to determine the radio resource and the beam is further configured to:

classify at least one beam exceeding a reference value among beams of the base station;

determine one of the at least one beam as a cooperation beam for use in the cooperative communication; and exclude at least one beam less than the reference value among beams of the base station from the cooperation beam for the cooperative communication.

14. The base station of claim 10, wherein the processor is further configured to allocate a radio resource except for the radio resource for the cooperative communication on a mobile station exceeding a predetermined moving speed and traffic to which a time delay does not apply.

15. The base station of claim 10, wherein the processor is further configured to transmit the first interference value per beam to the at least one neighbor base station periodically.

16. The base station of claim 10, wherein the processor is further configured to transmit the first interference value per beam to the at least one neighbor base station in response to a request from the at least one neighbor base station.

\* \* \* \* \*